United States Patent
Shintani et al.

(10) Patent No.: US 8,390,733 B2
(45) Date of Patent: Mar. 5, 2013

(54) IMAGING DEVICE WITH INTERCHANGEABLE LENS AND CAMERA BODY FOR IMAGING DEVICE

(75) Inventors: Dai Shintani, Osaka (JP); Kenichi Honjo, Osaka (JP); Norikazu Katsuyama, Osaka (JP)

(73) Assignee: Panasonic Corporation, Osaka (JP)

( * ) Notice: Subject to any disclaimer, the term of this patent is extended or adjusted under 35 U.S.C. 154(b) by 632 days.

(21) Appl. No.: 12/526,830

(22) PCT Filed: Feb. 13, 2008

(86) PCT No.: PCT/JP2008/000217
§ 371 (c)(1),
(2), (4) Date: Aug. 12, 2009

(87) PCT Pub. No.: WO2008/099605
PCT Pub. Date: Aug. 21, 2008

(65) Prior Publication Data
US 2010/0091175 A1      Apr. 15, 2010

(30) Foreign Application Priority Data

Feb. 15, 2007  (JP) .................................. 2007-034820

(51) Int. Cl.
*H04N 5/225* (2006.01)
*G03B 13/00* (2006.01)
(52) U.S. Cl. ........ 348/360; 348/350; 348/351; 348/353; 396/530
(58) Field of Classification Search .................. 348/360, 348/353–354
See application file for complete search history.

(56) References Cited

U.S. PATENT DOCUMENTS

| | | | |
|---|---|---|---|
| 5,231,444 A | 7/1993 | Watanabe et al. | |
| 6,407,774 B1 | 6/2002 | Mabuchi et al. | |
| 6,924,842 B2 * | 8/2005 | Yahagi | 348/360 |
| 6,999,684 B2 | 2/2006 | Sato et al. | |
| 7,233,358 B2 * | 6/2007 | Yoshikawa | 348/340 |
| 7,796,879 B2 * | 9/2010 | Sasaki | 396/148 |
| 7,848,630 B2 * | 12/2010 | Yahagi | 396/111 |

(Continued)

FOREIGN PATENT DOCUMENTS

| | | |
|---|---|---|
| JP | 57-111504 A | 7/1982 |
| JP | 4-214542 A | 8/1992 |

(Continued)

OTHER PUBLICATIONS

International Search Report of PCT Application No. PCT/JP2008/000217 dated May 20, 2008.

*Primary Examiner* — Ngoc-Yen Vu
(74) *Attorney, Agent, or Firm* — Panasonic Patent Center

(57) ABSTRACT

A camera system includes an interchangeable lens and a camera body to which the interchangeable lens can be mounted, either directly or via an adapter. A lens microcomputer of the interchangeable lens is configured to hold lens information including information related to a focal point detection method. A body microcomputer of the camera body is configured to select a focal point detection method on the basis of lens information. The body microcomputer is configured to select a contrast detection method as the focal point detection method if the interchangeable lens is compatible with a contrast detection method. The body microcomputer is configured to select a phase difference detection method as the focal point detection method if the interchangeable lens is not compatible with a contrast detection method, and the adapter is compatible with a phase difference detection method.

13 Claims, 20 Drawing Sheets

U.S. PATENT DOCUMENTS

| | | | |
|---|---|---|---|
| 2002/0140838 A1 * | 10/2002 | Yoshikawa | 348/345 |
| 2005/0158044 A1 | 7/2005 | Ide et al. | |
| 2005/0237417 A1 | 10/2005 | Miyasaka | |
| 2007/0269197 A1 | 11/2007 | Ide et al. | |
| 2011/0103789 A1 * | 5/2011 | Honjo et al. | 396/530 |
| 2012/0044407 A1 * | 2/2012 | Murashima et al. | 348/345 |

FOREIGN PATENT DOCUMENTS

| | | |
|---|---|---|
| JP | 5-064056 A | 3/1993 |
| JP | 10-333024 A | 12/1998 |
| JP | 2000-075197 A | 3/2000 |
| JP | 2000-098474 A | 4/2000 |
| JP | 2001-125173 A | 5/2001 |
| JP | 2003-043344 A | 2/2003 |
| JP | 2004-109864 * | 4/2004 |
| JP | 2004-109864 A | 4/2004 |
| JP | 2005-024843 A | 1/2005 |
| JP | 2005-025055 A | 1/2005 |
| JP | 2005-062459 A | 3/2005 |
| JP | 2005-208235 A | 8/2005 |
| JP | 2005-303933 A | 10/2005 |
| JP | 2007-310009 | 11/2007 |

* cited by examiner

| Type of interchangeable lens \ Type of camera body | Type 1 | Type 2 | |
|---|---|---|---|
| | | Adapter A (compatible with phase difference detection method) | Adapter B (incompatible with phase difference detection method) |
| Type 1-A, contrast detection method incompatible | (figure) | (figure) | (figure) |
| AF method | phase difference detection method | phase difference detection method | impossible (manual focus) |
| Type 1-B, contrast detection method compatible | (figure) | (figure) | (figure) |
| AF method | phase difference detection method, contrast detection method | phase difference detection method, contrast detection method | contrast detection method |

Fig. 3

| Type of interchangeable lens | Lens information | | Adapter information | | Determination processing with camera body | |
|---|---|---|---|---|---|---|
| | Lens ID | Contrast detection method compatibility information | Phase difference detection method compatibility information | Contrast detection method compatibility information | AF method that can be selected | |
| Type 1-A | Type 1-A | incompatible | compatible (adapter A) | incompatible | phase difference detection method | |
| | | | incompatible (adapter B) | incompatible | no selection position (manual focus) | |
| Type 1-B | Type 1-B | compatible | compatible (adapter A) | compatible | phase difference detection method, contrast detection method | |
| | | | incompatible (adapter B) | compatible | contrast detection method | |
| Type 2 | Type 2 | compatible | (no adapter mounted) | compatible | contrast detection method | |

Fig. 12

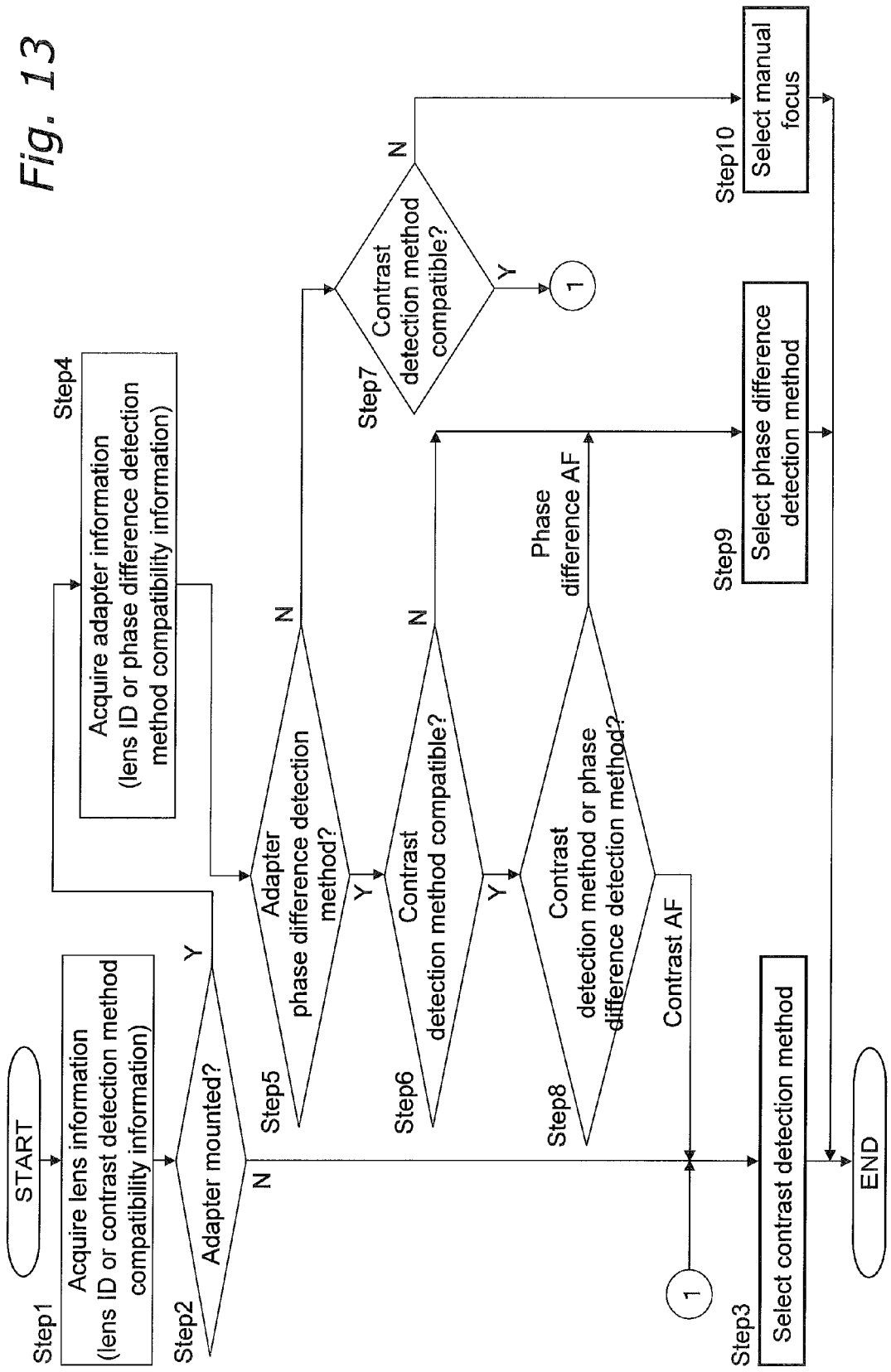

IMAGING DEVICE WITH INTERCHANGEABLE LENS AND CAMERA BODY FOR IMAGING DEVICE

CROSS-REFERENCE TO RELATED APPLICATIONS

This U.S. National stage application claims priority under 35 U.S.C. §119(a) to Japanese Patent Application No. 2007-034820 filed in Japan on Feb. 15, 2007, the entire contents of which are hereby incorporated herein by reference.

BACKGROUND

1. Technical Field

The technical field relates to an imaging device, and more particularly relates to a single lens reflex digital camera.

2. Background Information

Single lens reflex digital cameras, with which an optical image of a subject can be converted into an electrical image signal and outputted, have exploded in popularity in recent years. With these single lens reflex digital cameras, when the user views a subject through a viewfinder, a reflecting mirror is provided along an imaging optical path between an imaging lens and an element. The light incident on the imaging lens, that is, an subject image is reflected by a reflecting mirror to change its optical path, and is passed through a pentaprism or the like to create a positive image, and guided to the optical viewfinder. This allows the user to view the subject image through the imaging lens from the optical viewfinder. Therefore, the position where the viewfinder-use optical path is formed is usually the home position of the reflecting mirror.

Meanwhile, when the imaging lens is used to capture an image, the reflecting mirror instantly changes position and is retracted from the imaging optical path, so the viewfinder optical path is switched to the imaging optical path, and the mirror instantly returns to its home position once imaging is complete. With a single lens reflex camera, this operation is the same regardless of whether the camera is a conventional silver halide camera or a digital camera.

Also, a retractable sub-mirror is provided along the imaging optical path between the reflecting mirror and the imaging element. The sub-mirror is located along the imagine optical path during focal length measurement, and reflects the light incident on the imaging lens and guides it to a focal length measurement component. The focal length measurement component measures the focal length by a phase difference detection method, for example. The measured focal length is used for focal point detection.

Patent Citation 1: Japanese Laid-Open Patent Application 2001-125173

Thus, with a conventional digital single lens reflex camera, there was a space between the imaging lens and the imaging element which housed a reflecting mirror for forming the viewfinder optical path and a sub-mirror for forming the focal length detection optical path. Therefore, the size of the camera body could not be reduced in the optical axis direction (that is, the direction along the optical axis of the mounted interchangeable lens).

In view of this, there has been a proposal for a single lens reflex digital camera with which focal point detection is performed by a contrast detection method, so that there is no need to dispose a reflecting mirror and sub-mirror.

However, it is conceivable that an interchangeable lens and a camera body that each have a different focal point detection method may be combined. For instance, if an interchangeable lens that is not compatible with a contrast detection method is mounted, there is the risk that the camera body will not be compatible, and this makes the product less convenient to use.

SUMMARY

It is an object to improve the convenience of an imaging device and a camera body.

The imaging device according to a first aspect is an imaging device for acquiring an image of a subject, comprising an interchangeable lens and a camera body that allows the interchangeable lens to be mounted either directly or via an adapter. The interchangeable lens has an imaging optical system for forming an optical image of the subject, and a lens controller configured to hold lens information including information related to a focal point detection method. The camera body has an imaging part, a first focal point detector, and a main body controller. The imaging part converts an optical image of the subject into an image signal. The first focal point detector detects a contrast value on the basis of the image signal and determines the focal state of the optical image on the basis of the contrast value. The main body controller is capable of acquiring the lens information held in the lens controller, and selects the focal point detection method on the basis of the lens information. If the interchangeable lens is compatible with a contrast detection method, the main body controller selects a contrast detection method as the focal point detection method. If the interchangeable lens is not compatible with a contrast detection method, and the adapter is compatible with a phase difference detection method, the main body controller selects a phase difference detection method as the focal point detection method.

With this imaging device, if the interchangeable lens is compatible with a contrast detection method, a contrast detection method is selected as the focal point detection method by the main body controller. If the interchangeable lens is not compatible with a contrast detection method, and the adapter is compatible with a phase difference detection method, a phase difference detection method is selected as the focal point detection method by the main body controller. That is, even through the interchangeable lens may not be compatible with a contrast detection method, focal point detection will still be possible by phase difference detection method as long as the adapter is compatible with a phase difference detection method. Accordingly, this imaging device is compatible with many different interchangeable lenses, and this improves its convenience.

The phrase "the main body controller is capable of acquiring the lens information" encompasses cases in which the main body controller acquires lens information both directly and indirectly. Accordingly, the main body controller will be able to acquire the lens information even if another controller is connected between the main body controller and the lens controller, and lens information is sent through this other controller to the main body controller, or if information newly produced by the other controller on the basis of lens information is sent to the main body controller, for example.

The imaging device according to a second aspect is the imaging device according to the first aspect, wherein, if the interchangeable lens is compatible with a contrast detection method and the adapter is compatible with a phase difference detection method, the main body controller selects either a contrast detection method or a phase difference detection method as the focal point detection method.

The imaging device according to a third aspect is the imaging device according to the first or second aspect, wherein the main body controller determines whether or not the interchangeable lens is compatible with a contrast detection method on the basis of the lens information.

The imaging device according to a fourth aspect is the imaging device according to any of the first to third aspects, wherein the adapter has an adapter controller configured to hold adapter information including information related to a focal point detection method. The main body controller determines whether or not the adapter is compatible with a phase difference detection method on the basis of the adapter information.

The imaging device according to a fifth aspect is the imaging device according to any of the first to fourth aspects, wherein the interchangeable lens has a focal point adjuster including a focus lens group included in the imaging optical system and a position detector configured to detect the position of the focus lens group. The lens information has at least one type of information selected from among information for specifying the interchangeable lens, information related to whether or not there is a drive margin range for the focus lens group, and information related to the specifications of the position detector.

The imaging device according to a sixth aspect is the imaging device according to any of the first to fifth aspects, wherein, if the interchangeable lens has the drive margin range, the main body controller determines that the interchangeable lens is compatible with a contrast detection method. If the interchangeable lens does not have the drive margin range, the main body controller determines that the interchangeable lens is not compatible with a contrast detection method.

The imaging device according to a seventh aspect is the imaging device according to any of the first to sixth aspects, wherein the position detector has a relative position detector configured to detect the movement direction and movement amount of the focus lens group. The lens information includes information related to the specifications of the relative position detector. If the relative position detector has a two-phase encoder, the main body controller determines that the interchangeable lens is compatible with a contrast detection method. If the relative position detector has a single-phase encoder, the main body controller determines that the interchangeable lens is not compatible with a contrast detection method.

The imaging device according to an eighth aspect is the imaging device according to any of the first to seventh aspects, further comprising an adapter, which is a unit that can be mounted to the camera body and the interchangeable lens in between the camera body and the interchangeable lens, and which has a mirror arranged to reflect part of the light emitted from the imaging optical system, and a second focal point detector that utilizes the light reflected by the mirror to determine the focal state by a phase difference detection method.

The imaging device according to a ninth aspect is the imaging device according to any of the first to eighth aspects, wherein the mirror is a pellicle mirror.

The imaging device according to a tenth aspect is an imaging device configured to acquire an image of a subject, comprising an interchangeable lens and a camera body that allows the interchangeable lens to be mounted, or allows the interchangeable lens to be mounted via an adapter. The interchangeable lens has an imaging optical system arranged to form an optical image of the subject. The camera body has an imaging part, a focal point detector, a mounting detector, and a main body controller. The imaging part converts an optical image of the subject into an image signal. The focal point detector detects a contrast value on the basis of the image signal and determines the focal state of the optical image on the basis of the contrast value. The mounting detector detects that the adapter has been mounted. The main body controller selects the focal point detection method on the basis of the detection result of the mounting detector.

With this imaging device, since the focal point detection method is selected on the basis of the fact that an adapter has been mounted to the camera body, if, for example, the adapter is compatible with a phase difference detection method, a phase difference detection method is selected as the focal point detection method, which expands the selection range for the focal point detection method. This makes the imaging device more convenient to use.

The imaging device according to an eleventh aspect is the imaging device according to the tenth aspect, wherein, if the mounting detector detects that the adapter has been mounted, the main body controller selects a phase difference detection method as the focal point detection method.

The camera body according to a twelfth aspect is used along with an interchangeable lens in an imaging device configured to acquire an image of a subject, and allows the interchangeable lens to be mounted, or allows the interchangeable lens to be mounted via an adapter. The interchangeable lens includes an imaging optical system arranged to form an optical image of the subject, and a lens controller configured to hold lens information including information related to a focal point detection method. This camera body includes an imaging part, a focal point detector, and a main body controller. The imaging part is configured to convert an optical image of the subject into an image signal. The focal point detector is configured to detect a contrast value on the basis of the image signal and is configured to determine the focal state of the optical image on the basis of the contrast value. The main body controller is configured to acquire the lens information held in the lens controller and is configured to select the focal point detection method on the basis of the lens information. The main body controller is configured to select a contrast detection method as the focal point detection method if the interchangeable lens is compatible with a contrast detection method. The main body controller is configured to select a phase difference detection method as the focal point detection method if the interchangeable lens is not compatible with a contrast detection method and the adapter is compatible with a phase difference detection method.

With this camera body, if the interchangeable lens is compatible with a contrast detection method, the main body controller selects a contrast detection method as the focal point detection method. If the interchangeable lens is not compatible with a contrast detection method and the adapter is compatible with a phase difference detection method, the main body controller selects a phase difference detection method as the focal point detection method. That is, even though the interchangeable lens is not compatible with a contrast detection method, focal point detection will still be possible as long as the adapter is compatible with a phase difference detection method. Accordingly, this camera body is compatible with many different interchangeable lenses, and this improves its convenience.

BRIEF DESCRIPTION OF DRAWINGS

FIG. 3 is a simplified connection diagram for a combination of an interchangeable lens and a camera body;

FIG. 12 is a diagram illustrating the decision processing by AF method in which a selection can be made according to the combination of interchangeable lens and first and second camera bodies (type 2);

FIG. 13 is a flowchart (1) related to AF method selection processing performed by first and second camera bodies (type 2);

DETAILED DESCRIPTION OF THE PREFERRED EMBODIMENTS

The imaging device according to the present aspect will now be described through reference to the drawings. Components that have substantially the same function are numbered the same and will not be described more than once.

Figure 1:
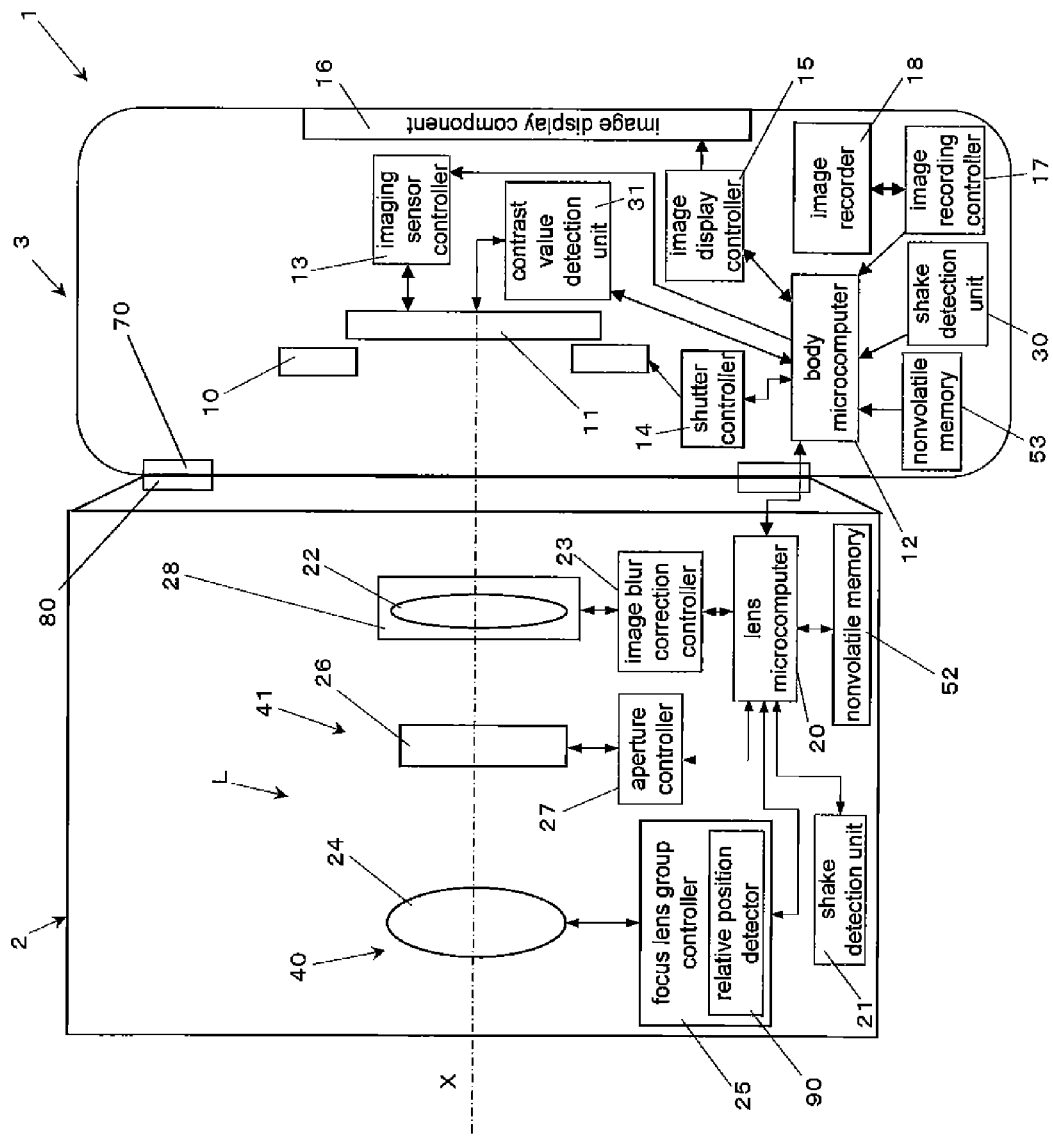
FIG. 1 is a diagram of the overall configuration of a camera system 1.

In this text, "front" means on the subject side with respect to the camera body, and corresponds to the left direction in FIG. 1, for example. The term "rear" means the opposite side from the subject side with respect to the camera body, that is, the imaging element side with respect to the imaging optical system, and corresponds to the right direction in FIG. 1. The term "upper" corresponds to above in the vertical direction when the long-side direction of the captured image is horizontal, and corresponds to the upward direction in FIG. 1. Usually, the side where the release button is disposed in the camera body corresponds to the upper side. "Lower" refers to the opposite direction from the upper side, and corresponds to the downward direction in the drawings. The front, rear, upper, and lower faces of the various components are called the front face, rear face, upper face, and lower face, respectively.

1: Overall Configuration of First Camera System

FIG. 1 is a diagram of the overall configuration of a camera system 1 according to a first embodiment.

As shown in FIG. 1, the camera system 1 (serving as an imaging device) is a system used in an interchangeable lens type of single lens reflex digital camera, for example, and mainly comprises a camera body 3 having the main functions of the camera system 1, and an interchangeable lens 2 that is removably mounted to the camera body 3. The interchangeable lens 2 is mounted to a first lens mount 70 provided to the front face of the camera body 3.

This camera system 1 will now be summarized.

A contrast detection method is employed as the focal point detection method of the camera body 3. For example, when an interchangeable lens that is compatible with a contrast detection method is mounted (such as the interchangeable lens 2), a contrast detection method may be selected as the focal point detection method for the camera system 1.

However, it is conceivable that the interchangeable lens that will be mounted may be any of various other kinds of interchangeable lens besides the interchangeable lens 2, and we must take into account the possibility that the mounted interchangeable lens will not be compatible with a contrast detection method. The configuration of the camera body and interchangeable lens that are primarily being assumed here will now be described.

1.1: Configuration of First Camera Body

The first camera body 3 shown in FIG. 1 mainly comprises an imaging sensor 11 (as an imaging part), a body microcomputer 12 (as a main body controller), an image display component 16, an image display controller 15, an image recorder 18, an image recording controller 17, and the first lens mount 70. The interchangeable lens 2, which has a first body mount 80, is removably mounted to the first lens mount 70.

The imaging sensor 11 is used to obtain image signals by converting an optical image of the subject formed on the imaging face into an image signal, and is a CCD, CMOS, or the like. The body microcomputer 12 controls the operation of the various components. The image display component 16 displays captured images and various kinds of information. The image display controller 15 controls the operation of the image display component 16. The image recorder 18 reads image data from a recording medium and records it to the recording medium. The image recording controller 17 controls the image recorder 18.

The first camera body 3 further comprises a nonvolatile memory 53, a contrast value detection unit 31, a shake detection unit 30, a shutter unit 10, a shutter controller 14, and an imaging sensor controller 13. The contrast value detection unit 31 detects a contrast value from the image signal acquired by the imaging sensor 11. The shake detection unit 30 detects movement of the camera body 3 caused by hand shake or the like. The shutter unit 10 adjusts the exposure state of the imaging sensor 11. The shutter controller 14 controls the drive of the shutter unit 10 on the basis of a control signal from the body microcomputer 12. The imaging sensor controller 13 controls the operation of the imaging sensor 11.

The body microcomputer 12 is the main control apparatus for the camera body 3, and controls various sequences. More specifically, a CPU, ROM, and RAM are installed in the body microcomputer 12, and the CPU reads the programs loaded in the ROM, which allows the body microcomputer 12 to carry out its various functions. For example, the body microcomputer 12 has the function of detecting that the interchangeable lens 2 has been mounted to the camera body 3, the function of detecting that an adapter (discussed below) has been mounted to the camera body 3, the function of determined whether or not a contrast detection method or a phase difference detection method is compatible on the basis of lens information (discussed below) and adapter information (discussed below), the function of selecting a focal point detection method, the function of setting an image blur corrector (discussed below) to a correctable state and a non-correctable state, and so forth. As shown in FIG. 1, the body microcomputer 12 is connected to the various components provided to the camera body 3.

The shake detection unit 30 has an angular velocity sensor that detects movement of the camera body 3 due to hand shake or the like. The angular velocity sensor outputs a positive or negative angular velocity signal according to the direction in which the camera body 3 is moved on the basis of the output in a state in which the camera body 3 is standing still. In this embodiment, two angular velocity sensors are provided for detecting in two directions, namely, the yaw and pitch directions. The outputted angular velocity signal goes through filtering, amplification, and other such processing, is converted into a digital signal by an A/D converter, and is sent to the body microcomputer 12. The body microcomputer 12 sends the angular velocity signal to a lens microcomputer 20 via an electrical contact (not shown) provided to the first lens mount 70. The lens microcomputer 20 sequentially subjects the angular velocity signal to filtering, integration, phase compensation, gain adjustment, clipping, and so forth to calculate the amount of drive control of an image blur correcting lens group 22 needed for image blur correction, and outputs this amount as a control signal. The outputted control signal is outputted through a D/A converter to a lens-use image blur corrector 28.

The camera body 3 is also provided with a power switch (not shown) for turning the power on and off to the camera system 1, and a release button (not shown) operated by the user during focusing and shutter release. When the power switch is moved to the on position, power is supplied to the various components of the camera body 3 and the interchangeable lens 2.

The nonvolatile memory 53 also holds various kinds of information related to the camera body 3 (body information). This body information includes, for example, the name of the manufacturer of the camera body 3, the manufacture date, the model number, the version of software installed in the body microcomputer 12, information related to firmware updates, and other such information related to the model for specifying the camera body 3 (main body specification information), information related to whether or not an image blur corrector has been installed in the camera body 3, information related to detection performance such as sensitivity and the model number of the shake detection unit 30, and error history. All of this information may be stored in a memory component inside the body microcomputer 12 rather than in the nonvolatile memory 53.

The camera body 3 is provided with a release button (not shown), a first switch S1 that is connected to the release button and is operated by being pressed halfway down, and a second switch S2 that is connected to the release button and is operated by being pressed all the way down. Specifically, when the release button is pressed halfway down, the first switch S1 is in an on state, and when pressed all the way down, the first switch S1 and the second switch S2 are both in an on state. When the release button is pressed halfway down and the first switch S1 is in an on state, power is supplied to the various components, starting with the body microcomputer 12 and the lens microcomputer 20.

The contrast value detection unit 31 detects a contrast value from an image signal acquired by the imaging sensor 11, and outputs it to the body microcomputer 12. The contrast value is used to realize an auto-focus function (discussed below).

The camera body 3 does not have a reflecting mirror for forming a viewfinder optical path, or a sub-mirror for forming a focal point distance detection optical path. The distance in the optical axis direction from the front face of the first lens mount 70 to the imaging face of the imaging sensor 11 (hereinafter referred to as the flange focal distance) is less than the flange focal distance of a conventional camera system 1. Therefore, the camera body 3 in this embodiment can be smaller in size in the optical axis direction (that is, the direction of the optical axis X of the mounted interchangeable lens 2) than with a conventional camera body. Also, the image captured by the imaging sensor 11 is displayed in real time by the image display component 16, rather than in an optical viewfinder.

1.2: Configuration of First Interchangeable Lens

The first interchangeable lens 2 mainly comprises an imaging optical system L for forming a subject image on the imaging face of the imaging sensor 11, a focus adjuster 42 for performing focusing, an aperture adjuster 41 for adjusting the aperture, the lens-use image blur corrector 28, the lens microcomputer 20 serving as a lens controller for controlling the operation of the interchangeable lens 2, a nonvolatile memory 52, and the first body mount 80 that can be mounted to the first lens mount 70. The lens-use image blur corrector 28 is a unit for adjusting the optical path and thereby correcting any image blur caused by movement of the camera body 3.

The focus adjuster 42 mainly comprises a focus lens group 24 that can be driven in the optical axis direction and that adjusts the focus by movement in the optical axis direction, and a focus lens group controller 25 that controls the drive of the focus lens group 24.

The focus lens group 24 is able to move in the optical axis direction within a standard range F from the closest focal position F1 determined as the limit for the first interchangeable lens 2 to the infinity focal position F2. Also, the focus lens group 24 must be able to move forward and backward in the optical axis direction with the focal position in between, because of focal position detection by the contrast method discussed below, so there are also drive margin ranges H1 and H2, over which movement is possible back and forth in the optical axis direction, beyond the above-mentioned standard range F from the closest focal position F1 to the infinity focal position F2.

The focus lens group controller 25 has a relative position detector 90 that detects the relative position of the focus lens group 24 in the optical axis direction. The relative position detector 90 cannot by itself detect an absolute position, but is able to detect a movement direction. A two-phase encoder is used, for example, as the relative position detector 90. Examples of two-phase encoders include a rotary pulse encoder, an MR element (magnet resistive element), and a Hall element. Two sensors are provided for the two-phase encoder. The sensors alternately output binary signals at equal pitches according to the position of the focus lens group 24 in the optical axis direction. The two sensors are disposed so as to offset the phase of the pitches. The lens microcomputer 20 computes the relative position of the focus lens group 24 in the optical axis direction from the output of the relative position detector 90.

The aperture adjuster 41 mainly comprises an aperture component 26 for opening or closing the aperture, and an aperture controller 27 for controlling the operation of the aperture component 26.

The lens-use image blur corrector 28 mainly comprises the image blur correcting lens group 22 and an image blur correction controller 23. The image blur correction controller 23 is a unit that drives and controls the image blur correcting lens group 22, and moves the image blur correcting lens group 22 up, down, left, and right within the horizontal plane perpendicular to the optical axis of the imaging optical system L. The lens-use image blur corrector 28 further comprises a movement amount detector (not shown). The movement amount detector is used to detect the actual amount of movement of the image blur correcting lens group 22, and along with the image blur correction controller 23 forms a feedback control loop for controlling the drive of the image blur correcting lens group 22.

The lens microcomputer 20 is the main control apparatus for the interchangeable lens 2, and is connected to the various components installed in the interchangeable lens 2. More specifically, a CPU, ROM, and RAM are installed in the lens microcomputer 20, and the CPU reads the programs loaded in the ROM, which allows the lens microcomputer 20 to carry out its various functions. For example, the lens microcomputer 20 has the function of setting the lens-use image blur corrector to a correctable state or a non-correctable state on the basis of a signal from the body microcomputer 12. Also, the body microcomputer 12 and the lens microcomputer 20 are electrically connected via electrical contacts (not shown) provided to the first lens mount 70 and the first body mount 80, respectively, allowing information to be transmitted and received between these. This communication may also be accomplished by optical communication or by wireless radio waves. The lens microcomputer 20 is connected to the various components provided to the interchangeable lens 2.

The nonvolatile memory 52 holds various kinds of information related to the interchangeable lens 2 (lens information). This lens information includes, for example, the name of the manufacturer of the interchangeable lens 2, the manufacture date, the model number, the version of software installed in the lens microcomputer 20, information related to firmware updates, and other such information related to the model for specifying the interchangeable lens 2 (lens specification information), information related to whether or not an image blur corrector has been installed in the interchangeable lens 2, and if an image blur corrector has been installed, information related to detection performance such as sensitivity and the model number of the shake detection unit 21, information related to correction performance such as a maximum correctable angle and the model number of the image blur corrector (lens-side correction performance information), and the version of the software for performing image blur correction. Furthermore, the lens information includes information related to the power consumption required for driving the image blur corrector (lens-side power consumption information) and information related to the type of drive of the image blur corrector (lens-side drive type information). It is also possible to hold information sent from the body microcomputer 12. All of this information may be stored in a memory component inside the lens microcomputer 20 rather than in the nonvolatile memory 52.

Figure 2:
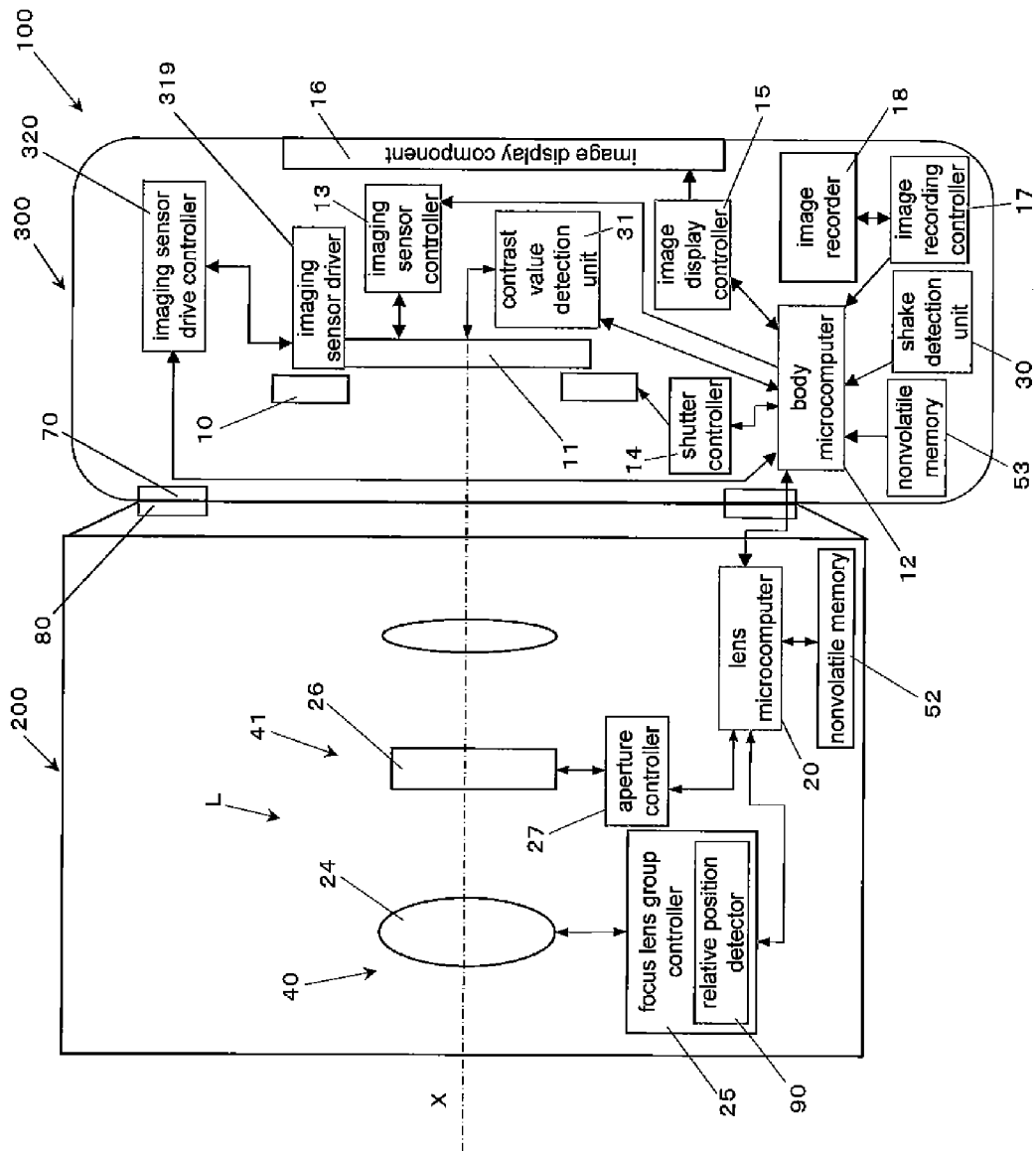
FIG. 2 is a diagram of the overall configuration of a camera system 100.

2: Configuration of Second Camera System 2.1: Configuration of Second Camera Body The second camera body 300 shown in FIG. 2 further comprises an imaging sensor driver 319 and an imaging sensor drive controller 320, in addition to the first camera body 3. The imaging sensor driver 319 drives the imaging sensor 11 so as to correct image blur according to the output of the shake detection unit 30. The imaging sensor drive controller 320 controls the operation of the imaging sensor driver 319. As shown in FIG. 2, the body microcomputer 12 is connected to the imaging sensor drive controller 320.

A camera body-use image blur corrector 328 mainly has the imaging sensor driver 319 and the imaging sensor drive controller 320. The imaging sensor drive controller 320 controls the imaging sensor driver 319 and moves the imaging sensor 11 up, down, left, and right within the horizontal plane perpendicular to the optical axis of the imaging optical system L. The camera body-use image blur corrector 328 further has a movement amount detector (not shown). The movement amount detector is a unit that detects the actual amount of movement of the imaging sensor 11, and along with the imaging sensor drive controller 320 forms a feedback control loop for controlling the drive of the imaging sensor 11.

2.2: Configuration of Second Interchangeable Lens

A second interchangeable lens 200 will be described through reference to FIG. 2. The second interchangeable lens 200 is an interchangeable lens in which the image blur corrector is excluded from the first interchangeable lens 2, and otherwise its configuration is the same as that of the first interchangeable lens 2.

2.3: Combination of Interchangeable Lens and Camera Body

The first camera system 1 shown in FIG. 1 is a combination of the first camera body 3 in which no image blur corrector is installed, and the first interchangeable lens 2 that has the built-in lens-use image blur corrector 28. The second camera system 100 shown in FIG. 2 is a combination of the second camera body 300 with the built-in image blur corrector 328, and the second interchangeable lens 200 that does not have a built-in image blur corrector. The body microcomputer 12 and the lens microcomputer 20 can exchange information so as to allow functioning regardless of the combination.

As shown in FIG. 2, for example, when the second camera body 300 with a built-in image blur corrector is combined with the first interchangeable lens 2 with the built-in image blur corrector shown in FIG. 1, information to the effect that the image blur corrector 28 is built in is sent from the first interchangeable lens 2 to the body microcomputer 12. The second camera body 300 asks the user to choose which image blur corrector to use, or the preset image blur corrector is automatically selected by the body microcomputer 12.

3: Interchangeability of Camera Body and Interchangeable Lens

As discussed above, the first and second camera bodies 3 and 300 do not have a reflecting mirror for forming a viewfinder-use optical path or a sub-mirror for forming a focal length detection optical path. Therefore, the distance in the optical axis direction from the front face of the first lens mount 70 to the imaging face of the imaging sensor 11, known as the flange focal distance, is set smaller than the flange focal distance of a conventional single lens reflex camera system. Furthermore, this camera body 3 does not have a phase difference detection type of auto-focus method.

Because of the above, interchangeability with various interchangeable lenses is achieved with this camera body 3, which takes into account a case in which an interchangeable lens other than the first interchangeable lens 2 corresponding to the first camera body 3 is mounted to the camera body 3.

3.1: Flange Focal Distance

FIG. 3 is a simplified connection diagram for a combination of an interchangeable lens. In FIG. 3, the body is classified as either type 1 or type 2, and the lens is classified as either type 1-A or type 1-B. FIG. 3 shows a simplified diagram of when an interchangeable lens and camera body of different types are connected.

A type 1 camera body 903 is a conventional camera body that has, for example, a reflecting mirror 904 that guides the optical path to an optical viewfinder (not shown), a sub-mirror 4 that guides the optical path to a focal point detection unit 6, and the imaging sensor 11. Meanwhile, a type 2 camera body is the first and second camera bodies 3 and 300 according to this embodiment, for example. The flange focal distance of the type 1 camera body 903 is greater than the flange focal distance of the type 2 camera body 3.

A type 1-A interchangeable lens 720 and a type 1-B interchangeable lens 920 are each an interchangeable lens corresponding to the flange focal distance of the type 1 camera body 903. Specifically, the type 1 camera body 903 has a body mount 81 that can be mounted to a lens mount 71, and the distance in the optical axis direction from the rear focal position of the imaging optical system L to the rear face of the body mount 81 (hereinafter referred to as the back focus) is equal to the flange focal distance of the type 1 camera body 903. The differences between the type 1-A and 1-B interchangeable lenses will be discussed below.

When the type 1-A or type 1-B interchangeable lens 720 or 920 is directly mounted to the type 2 camera body 3, which has a shorter flange focal distance, the focal point is greatly shifted to the rear from the imaging sensor 11. In view of this, it is possible to mount an adapter, which corrects the difference between the flange focal distance of the type 1 camera body and the flange focal distance of the type 2 camera body, between the type 2 camera body 3 and the type 1-A or type 1-B interchangeable lens 720 or 920. When an adapter is used, the focal position can be located on the imaging face of the imaging sensor 11 by the focus lens group 24 of the type 1-A or type 1-B interchangeable lens 720 or 920.

3.2: Auto-Focus Method

The type 1 camera body 903 is capable of focal position detection by phase difference detection method (phase difference detection AF (auto-focus)). On the other hand, the type 2 camera body 3 is not capable of focal position detection by phase difference detection method. Also, the type 2 camera body 3 is capable of focal position detection by contrast detection method (contrast AF (auto-focus)).

In FIG. 3, two types of adapters, A and B, are given as examples of the adapter for adjusting the back focus. The adapter A has the focal point detection unit 6 inside, while the adapter B does not have the focal point detection unit 6. The focal point detection unit is, for example, a phase difference detector that produces two images with a separator lens and measures the interval between the two images.

Next, the type 1-A and type 1-B interchangeable lenses will be described. The type 1-A interchangeable lens 720 is not compatible with a contrast detection method, but is compatible with a phase difference detection method. On the other hand, the type 1-B interchangeable lens 920 is compatible with a contrast detection method and a phase difference detection method in an AF method. Since the type 1-B interchangeable lens 920 is compatible with a contrast detection method, as discussed below, the range over which the focus lens group 24 moves and the method for detecting the position of the focus lens group 24 are different from those with type 1-A.

We will now describe an AF method that can be selected according to the combination of the adapters A and B, the type 1-A and type 1-B interchangeable lenses, and the type 1 and type 2 camera bodies 3 described above.

When the type 1-A interchangeable lens 720 has been connected, the conditions are not compatible with a contrast detection method, so a contrast detection method cannot be used regardless of the specifications of the camera body or the adapter. When the type 1-B interchangeable lens 920 has been connected, the conditions are compatible with a contrast detection method, so a contrast detection method can be used regardless of the specifications of the camera body or the adapter.

When the type 1 camera body 903 is used, since the phase difference detection method-use sub-mirror 4 and the focal point detection unit 6 are provided, a phase difference detection method can be used regardless of the specifications of the interchangeable lens or the adapter. When the type 2 camera body 3 and the adapter A are used, since the phase difference detection method-use sub-mirror 4 and the focal point detection unit 6 are provided, a phase difference detection method can be used no matter which interchangeable lens is used. When the type 2 camera body 3 and the adapter B are used, since the phase difference detection method-use sub-mirror 4 and the focal point detection unit 6 are not provided, a phase difference detection method cannot be used no matter which interchangeable lens is used.

The methods that can be used are complied in FIG. 3.

The operation of a phase difference detection method will be described briefly at this point. With a phase difference detection method, the focal point detection unit 6 receives light guided by the sub-mirror 4 to the focal point detection unit 6, a command is issued to the interchangeable lens so as to drive the focus lens group 24 on the basis of the amount of defocus (hereinafter referred to as Df amount) detected from the information thus received, the interchangeable lens moves the focus lens group 24 on the basis of this command, and the position of the focus lens group 24 is adjusted so that the focal point coincides (that is, a focused state), or substantially coincides, with the imaging face of the imaging sensor 11.

It should go without saying that manual focusing is possible no matter what the combination is.

4: Configuration of Single Lens Reflex Camera System with Adapter

Figure 4:
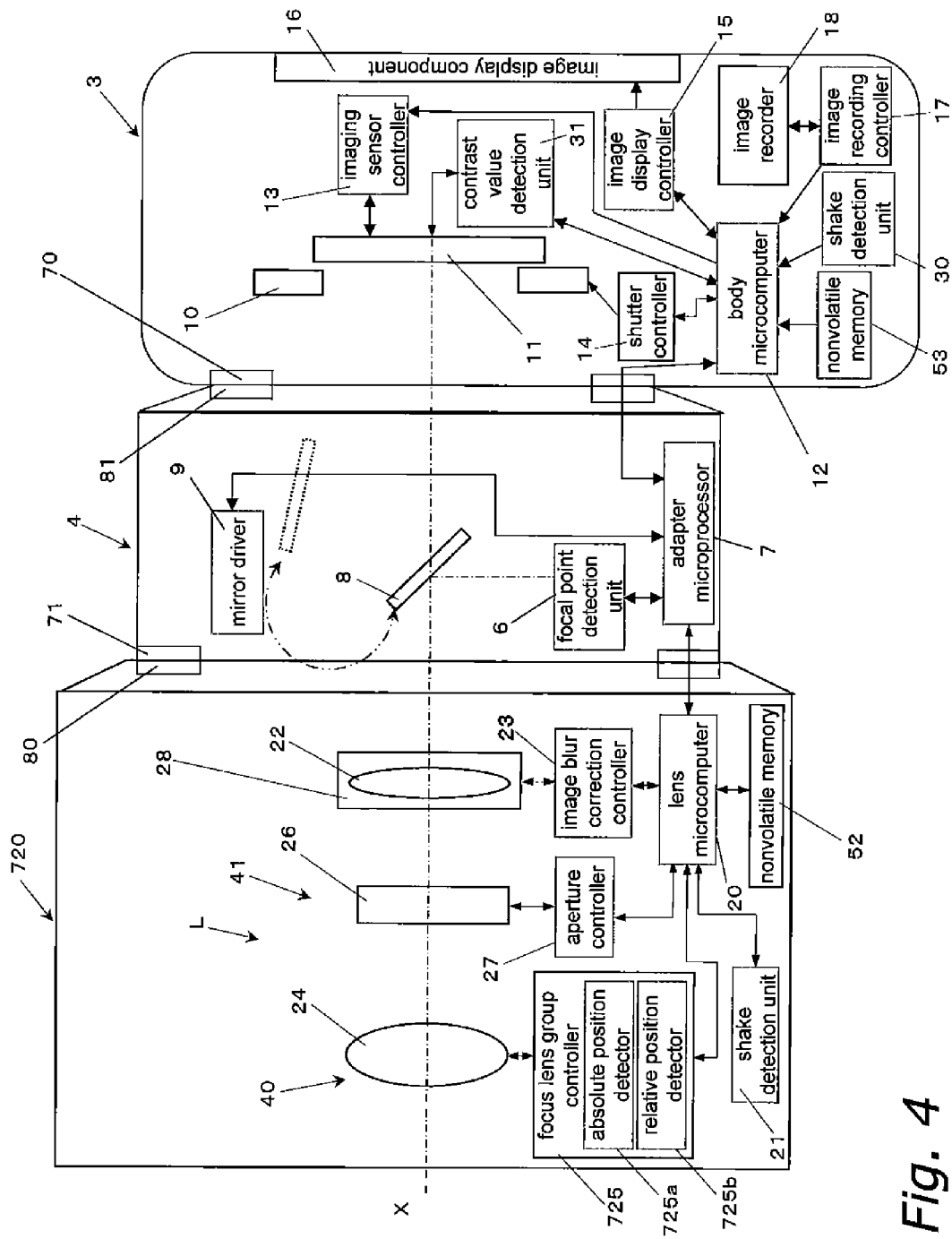
FIG. 4 is a diagram of the overall configuration of a camera system in which a first adapter is used.

The above-mentioned adapter A will now be described using a first adapter 4 as an example. For the sake of convenience, we will describe a case of using the first camera body 3 and a third interchangeable lens 720 corresponding to the above-mentioned type 1-A (equipped with an image blur correcting function) in FIG. 4. FIG. 4 shows a combination of the first camera body 3, the third interchangeable lens 720, and the first adapter 4 that is connected between these two.

4.1: Third Interchangeable Lens

The differences between the third interchangeable lens 720 and the first interchangeable lens 2 will be described. The distance in the optical axis direction from the focal position of the third interchangeable lens 720 to the rear face of the second body mount 81 (referred to as the back focus) is longer than that of the first interchangeable lens 2.

The focus lens group 24 is able to move in the optical axis direction over a standard range F from the closest focal position F1 determined as the limit for the third interchangeable lens 720 to the infinity focal position F2, but cannot move back and forth in the optical axis direction outside of the standard range F. That is, the interchangeable lens 720 does not have the drive margin ranges H1 and H2 had by the first interchangeable lens 2. This means that the interchangeable lens 720 is not compatible with auto-focusing by a contrast detection method.

A focus lens group controller 725 has a relative position detector 725b for detecting the relative position of the focus lens group 24 in the optical axis direction. The relative position detector 725b cannot by itself detect an absolute position, and cannot detect a movement direction. A single-phase encoder is used, for example. Examples of single-phase encoders include a rotary pulse encoder, an MR element (magnet resistive element), and a Hall element. One sensor is provided to the single-phase encoder. This sensor alternately outputs binary signals at equal pitches according to the position of the focus lens group 24 in the optical axis direction.

The focus lens group controller 725 further has an absolute position detector 725a for detecting the absolute position of the focus lens group 24 in the optical axis direction. The detection pitch of the position of the focus lens group 24 in the optical axis direction by the absolute position detector 725a is greater than the detection pitch of the position of the focus lens group 24 in the optical axis direction by the relative position detector 725b.

4.2: First Adapter

The first adapter 4 comprises a second body mount 81 that can be connected to the first lens mount 70 had by the first camera body 3, a second lens mount 71 that can be connected to the first body mount 80 of the third interchangeable lens 720, the focal point detection unit 6, an adapter microprocessor 7, a half mirror 8, and a mirror driver 9.

As shown in FIG. 4, the light from the subject (not shown) passes through the third interchangeable lens 720, part of the light incident on the first adapter 4 is reflected by the half mirror 8 and incident on the focal point detection unit 6, and the rest of the light passes through and is incident as a subject image on the imaging sensor 11 of the camera body 3. This subject image is electrically converted into an upright image and displayed on the image display component 16. This allows an upright image of the subject to be seen.

The flange focal distance of the interchangeable lens 720 is substantially equal to the distance from the lens mount 71 to the imaging sensor 11 of the camera body 3. That is, it is equal to the distance obtained by adding the distance between the imaging sensor 11 of the camera body 3 or 300 and the lens mount 70 of the above-mentioned camera system 1 or 100, to the distance of the lens mount 71 from the lens mount 70 of the adapter 4.

4.3: Operation During Imaging

If the user captures an image by looking at the image display component 16, when the power switch is used to turn on the power, power is supplied to the various components of the camera body 3, the adapter 4, and the interchangeable lens 720. When the user presses the release button halfway down, power is supplied to the various units and to the body microcomputer 12 of the camera body 3, and the body microcomputer 12, the adapter microprocessor 7, and the lens microcomputer 20 are electrically connected via electrical contacts (not shown) provided to the first lens mount 70, the first body mount 80, the second lens mount 71, and the second body mount 81, so that these can send and receive information to and from each other. This communication may also be accomplished by optical communication or by wireless radio waves.

The body microcomputer 12 and the lens microcomputer 20 are programmed so as to exchange information with each other at start-up. For example, lens information related to the interchangeable lens 720 is sent from the memory component of the lens microcomputer 20 to the body microcomputer 12, and this lens information is held in the memory component of the body microcomputer 12. The adapter microprocessor 7 sends information to the effect that an adapter has been connected, through the electrical contact (not shown) of the lens mount 70 to the body microcomputer 12. At this point the adapter microprocessor 7 also receives information related to whether or not an image blur corrector is installed in the interchangeable lens 720, determines how the various functions according to imaging operation will be used, and transmits to the body microcomputer 12. For example, with the configuration shown in FIG. 4, a command is issued so that the interchangeable lens 720 handles the function of image blur correction, while focal point detection is handled by the focal point detection unit 6 built into the adapter.

Next, when the user presses the release button halfway down, the amount of defocus (hereinafter referred to as Df amount) is acquired by the focal point detection unit 6 on the basis of the light reflected from the half mirror 8. The adapter microprocessor 7 sends this Df amount to the body microcomputer 12, and a command is issued from the body microcomputer 12 to the lens microcomputer 20 to drive the focus lens group 24 by this Df amount. More specifically, the focus lens group controller 725 is controlled by the lens microcomputer 20 and the focus lens group 724 moves by the Df amount. The Df amount can be reduced by repeating this focal point detection and drive of the focus lens group 724. Once the Df amount reaches or drops below a specific level, the body microcomputer 12 determines that the lens group is in focus, and the drive of the focus lens group 724 is halted.

After this, when the user presses the release button all the way down, a command is sent from the body microcomputer 12 to the lens microcomputer 20 so as to use the aperture value calculated on the basis of the output from a light sensor (not shown). The aperture controller 27 is controlled by the lens microcomputer 20, and the aperture is closed down to the indicated aperture value. At the same time as when the aperture value is specified, the adapter microprocessor 7 sends the mirror driver 9 a command to raise the mirror, and the half mirror 8 is retracted from the optical path X. Upon completion of this retraction, the imaging sensor controller 13 outputs a command to drive the imaging sensor 11, and the operation of the shutter unit 10 is indicated. The imaging sensor controller 13 exposes the imaging sensor 11 for a length of time equal to the shutter speed calculated on the basis of the output from a light sensor (not shown).

Upon completion of the exposure, the imaging sensor controller 13 reads image data from the imaging sensor 11, and after specific image processing, the image data is outputted through the body microcomputer 12 to the image display controller 15. As a result, the captured image is displayed on the image display component 16. Also, the image data is stored in a recording medium via the image recording controller 17 and the image recorder 18. Also, upon completion of exposure, the shutter unit 10 is reset to its initial value by the body microcomputer 12. Also, a command is sent from the body microcomputer 12 to the adapter microprocessor 7 and to the mirror controller 9 to drive the half mirror 8 into the optical path X. At the same time, a command is sent from the body microcomputer 12 to the lens microcomputer 20 and to the aperture controller 27 to reset the aperture to the open position, and a reset command is sent from the lens microcomputer 20 to the various units. Upon completion of the resetting, the adapter microprocessor 7 and the lens microcomputer 20 tell the body microcomputer 12 that resetting is complete. The body microcomputer 12 waits for resetting completion information from the adapter microprocessor 7 and the lens microcomputer 20 and for a series of processing after exposure, after which it is confirmed that the release button has not been pressed, and the imaging sequence is ended.

5: Auto-Focus

Figure 5:
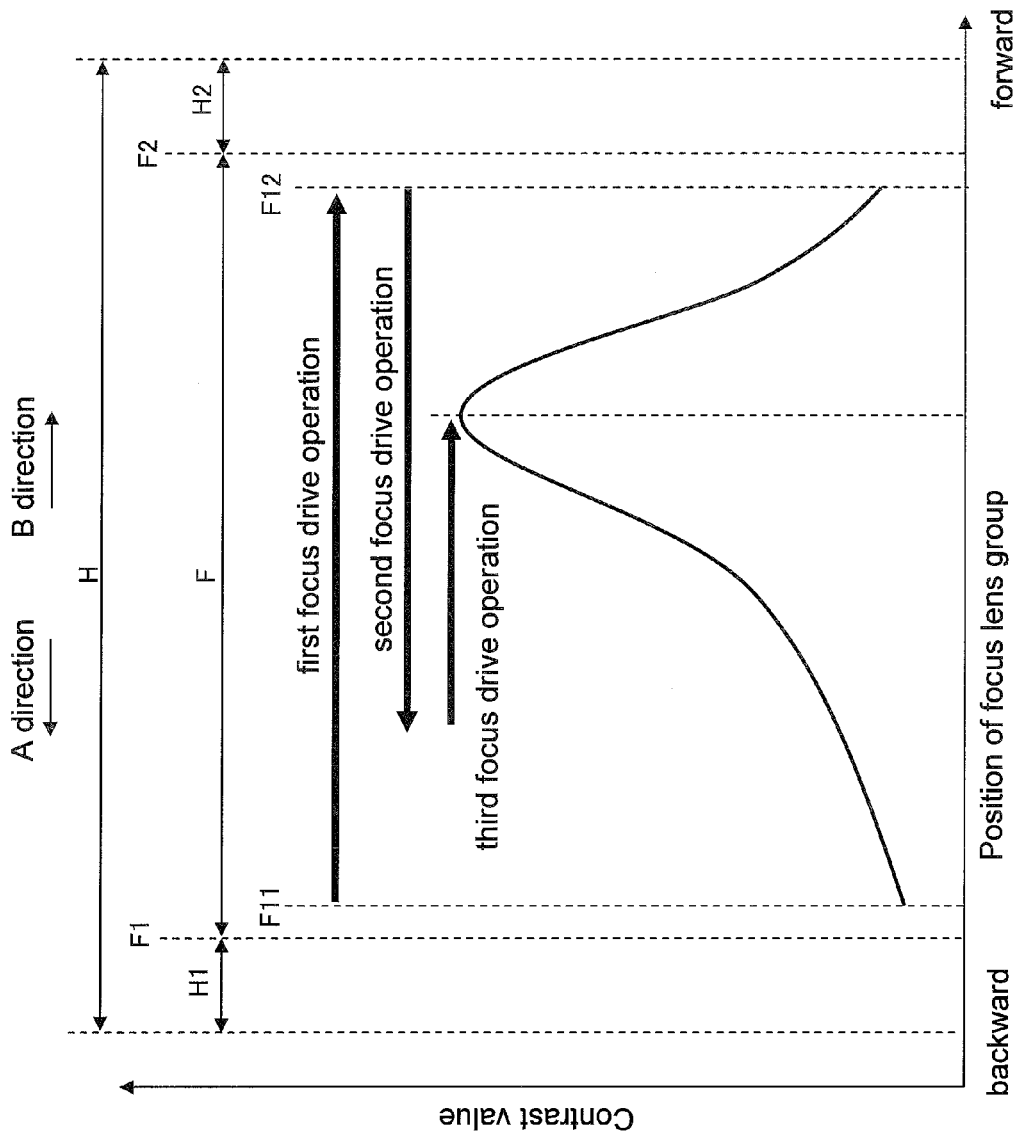
FIG. 5 is a diagram illustrating the operation of a focus lens in a contrast detection method.

The contrast detection method will be described through reference to FIG. 5. FIG. 5 is a diagram of the operation of a focus lens in a contrast detection method.

5.1: Basic Operation of Contrast Detection Method

As shown in FIG. 5, the peak contrast value is detected within a range (hereinafter referred to as the standard range) from the closest focal position F1 determined as the limit for the interchangeable lens to the infinity focal position F2, over which resolution, peripheral light amount, distortion, and other such aspects of lens function can be satisfied by moving the focus lens group 24 over the range of possible movement in the optical axis direction as determined by the mechanical configuration (hereinafter referred to as the movable range). Accordingly, to detect the contrast value in the standard range, the movable range must be wider than the standard range, and drive margin ranges H1 and H2 must be provided at the two ends, on the rear (near) side of the closest focal position F1 and the front (far) side of the infinity focal position F2.

The focus lens group 24 is driven in the optical axis direction by converting the rotary motion of a DC motor, an ultrasonic motor, or another such focus drive motor into linear motion via a transmission mechanism. Also, the relative position of the focus lens group 24 is detected indirectly by attaching a relative position detector to the transmission mechanism and detecting the relative rotational position.

The basic operation of the focus lens group 24 by contrast detection method includes three operations: a first focus drive operation, a second focus drive operation, and a third focus drive operation.

First, let us assume that the focus lens group 24 is in the contrast detection start position in FIG. 5. The focus lens group 24 is driven in the B direction from the contrast detection start position (first focus drive operation). Consequently, the optical image incident on the imaging sensor 11 changes, and the video signal outputted from the imaging sensor 11 also changes. The contrast value detection unit 31 detects the contrast value of this video signal and changes in the contrast value, and stores the position of the focus lens group 24 at the peak contrast value. If the focus lens group 24 is disposed at the stored position, then the optical image formed by the imaging optical system L is in focus. The position of the focus lens group 24 is determined by position information detected by the relative position detector 725b. After the peak position of the contrast value has been detected, the focus lens group 24 is stopped at the contrast detection end position in FIG. 5, and the flow moves on to the second focus drive operation.

In the second focus drive operation, the focus lens group 24 is driven in the A direction, which is the opposite direction from that in the first focus drive operation. When the movement of the focus lens group 24 is changing direction, backlash occurs in the transmission mechanism that links the focus lens group drive motor and the focus lens group. Backlash is a phenomenon in which a gap formed between members prevents the rotary motion from being converted into linear motion via the transmission mechanism. Although the output value of the relative position detector 725b that detects the rotational position varies while backlash is occurring, the focus lens group 24 does not move. Accordingly, even though the focus lens group 24 is moved to a position corresponding to the peak position of the contrast value in the second focus drive operation, it cannot be stopped at the proper position. In view of this, in the second focus drive operation, the group is not stopped at the peak position of the contrast value, and instead passes this position by.

The drive direction of the focus lens group 24 in the third focus drive operation is the same as that in the first focus drive operation in the detection of the peak position of the contrast value, so backlash has less of an effect. The focus lens group 24 is stopped at the focal position corresponding to the peak position of the contrast value, and the focusing operation is ended.

5.2: Contrast AF Method with a Single Lens Reflex Camera System

A contrast AF method is an AF method in which the focal position of the focus lens group 24 is adjusted by using the contrast value detection unit 31 to detect the peak contrast value in the video signal detected by the imaging sensor 11, and repositioning the focus lens group 24 at the detected peak position is important.

The contrast AF method is mainly used for compact digital still cameras, and makes use of a stepping motor (as the focus lens drive motor) and a screw feed mechanism that is directly linked to the motor shaft. Since the stepping motor performs rotation by making minute steps according to the number of pulses indicated, positioning precision is good. Also, since the above-mentioned screw feed mechanism biases the focus lens group in the optical axis direction, almost no backlash occurs. Therefore, the focus lens group can be repositioned at the peak position by storing the drive pulse number of the stepping motor at the point when the peak position is detected. However, since the torque generated by a stepping motor is low, it is difficult to generate enough torque to drive the focus lens group 24 with a stepping motor that is small enough to be installed in the interchangeable lens of a single lens reflex camera. Consequently, when contrast AF is performed in a single lens reflex digital camera system, it is difficult to constitute the focus drive system in the same way as with a compact type of digital still camera.

As to the configuration of the focus drive system in a single lens reflex camera system, DC motors and ultrasonic motors are mainly used for the focus drive motor. Unlike stepping motors, DC motors and ultrasonic motors do not allow the rotational position to be ascertained with the motor itself, so a position detector is provided externally.

The position detector of a conventional single lens reflex camera system is mainly made up of two components: the absolute position detector 725a and the relative position detector 725b. The absolute position detector 725a detects the position of the focus lens group 24. However, it is difficult to detect at a fine resolution, and therefore a relative position detector is used to detect at a fine resolution the relative rotational position of the motor.

Figure 6:
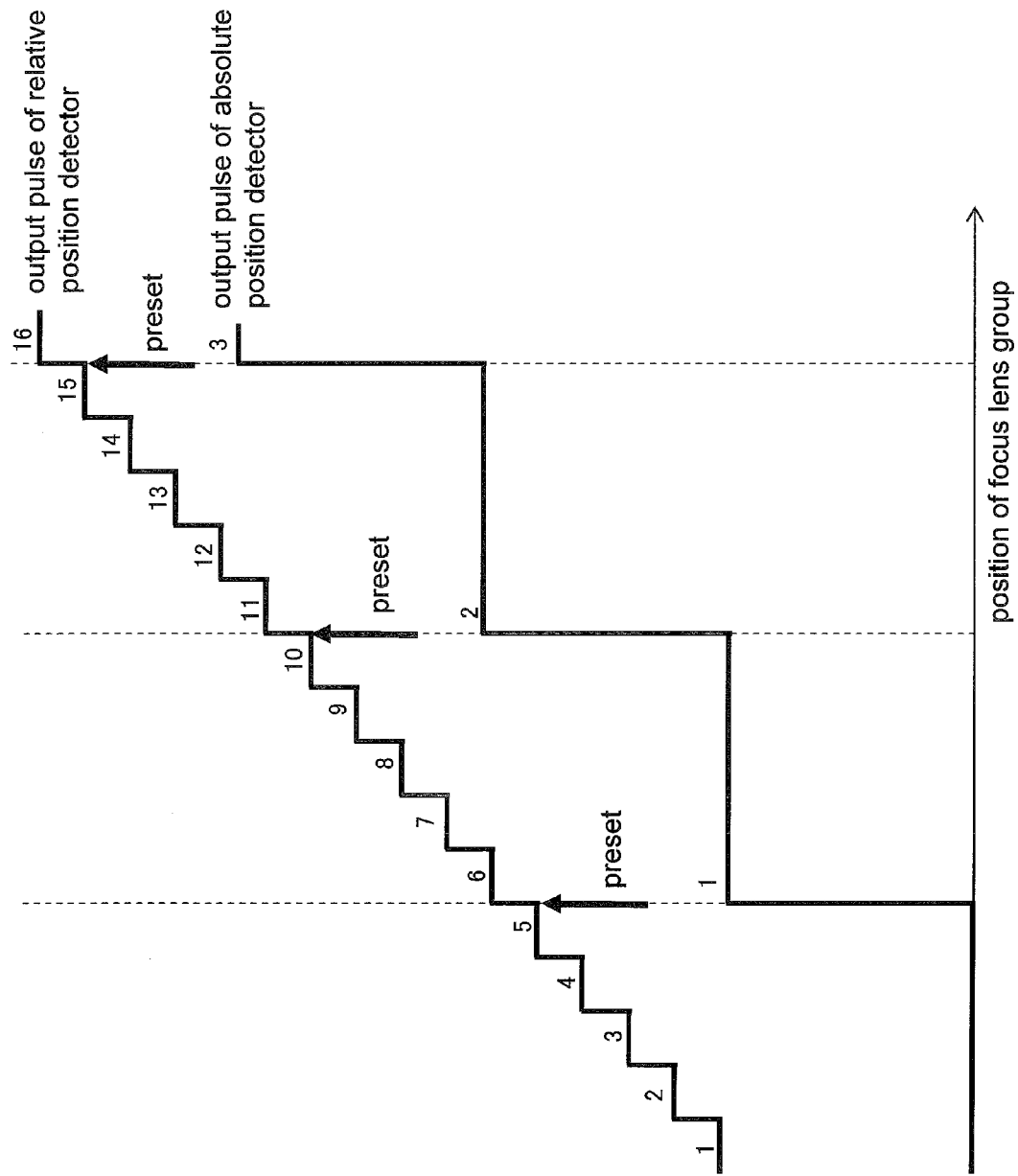
FIG. 6 is a diagram illustrating the operation for presetting a pulse count value of a relative position detector by an absolute position detector.

Also, with a conventional single lens reflex camera system, a phase difference detection method is generally used as the AF method, in which the Df amount obtained by the focal point detection unit 6 and the amount of movement of the focus lens group 24 from its current position to the focal position are calculated, and the motor is driven on the basis of this. With this AF method, the current position of the focus lens group 24 prior to focusing must be found by the absolute position detector 725a in order to issue a motor drive command, and a control command must be calculated on the basis of this position. Therefore, as shown in FIG. 6, the relationship of the two position detectors is constituted so that the value of the relative position detector is preset simultaneously with start-up, using the absolute position detector as a reference. In an embodiment, the relative position detector is automatically preset to 6, 11, and 16 with respect to the start-up 1, 2, 3 of the absolute position detector.

When a contrast AF method is conducted with a conventional single lens reflex camera system thus having two position detectors, a problem is a preset difference that occurs in presetting of the relative position detector 725b with the absolute position detector 725a.

Figure 7:
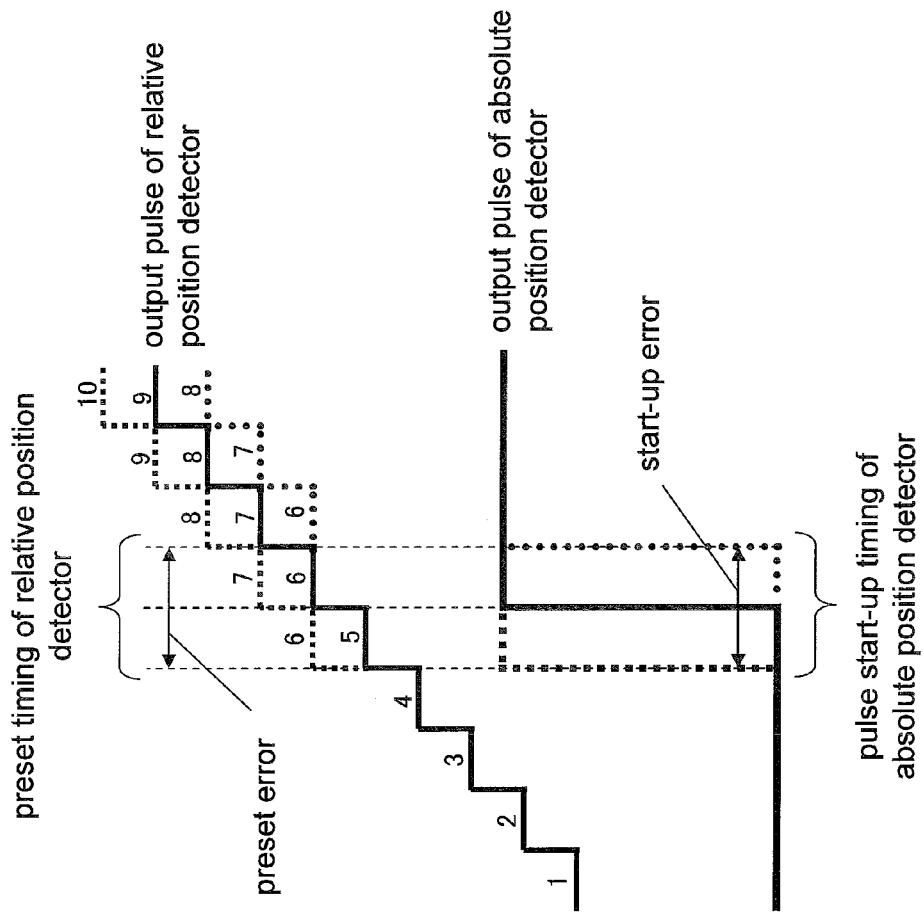
FIG. 7 is a diagram illustrating a preset error.

FIG. 7 is a graph of the output pulse of the relative position detector as a function of presetting error. In FIG. 7, a solid line indicates the ideal state for start-up timing of the absolute position detector 725a, and a broken line indicates that the start-up is earlier or later than this. In start-up in an ideal state, if the pulse of the relative position detector 725b is preset to 6, the pulse count of the relative position detector will continuously increase from before start-up of the absolute position detector 725a, but when an error occurs in the start-up, the pulse count of the relative position detector ends up being forcibly preset to 6, so it becomes impossible to count pulses continuously from the state prior to presetting. With a phase difference detection method, this presetting error does not pose a major problem because commands are updated so that the Df amount is gradually reduced, but when contrast AF is performed, this presetting error greatly affects positioning precision.

Figure 8:
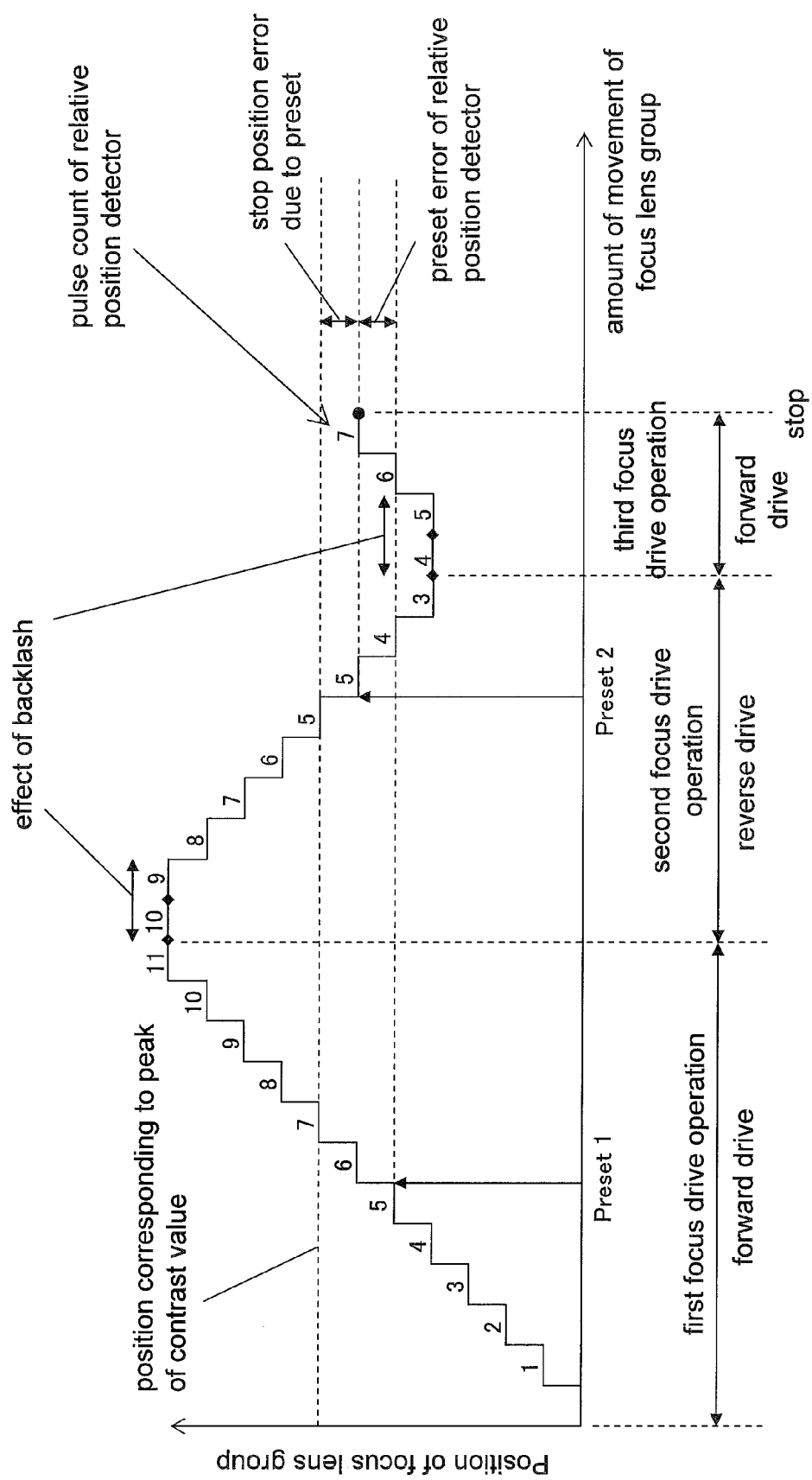
FIG. 8 is a diagram illustrating the effect of preset error in a contrast detection method.

FIG. 8 shows the effect that presetting error has on positioning precision during contrast AF. The effect of presetting error of the absolute position detector 725a will be described through reference to FIG. 8. In this description, the conditions for the drive pattern in FIG. 8 are set.

Conditions

The first and second focus drive operations are halted after four pulse counts once the peak position is exceeded.

The value of the relative position detector at presets 1 and 2, which are the preset timing with the absolute position detector, is preset to 6 on the way out and to 5 on the way back.

The focus drive operations will now be described.

(1) First Focus Drive Operation

The pulse count of the relative position detector 725b is commenced at the start of drive, and the pulse count is incremented by forward drive of the focus drive motor. The pulse count of the relative position detector 725b is preset to 6 at the timing of preset 1. At the point of preset 1, the preset is applied as has been set, and the pulse count of the relative position detector is continuously carried out from the start of drive. At the position where the pulse count is 8, it is detected that the position where the pulse count is 7 is the peak of the contrast value, and 7 is stored as the pulse count of the peak position. Drive is stopped at the position where the pulse count is 11, which is an advance of four pulses from the peak position, just as in the set conditions. The result of the above is that the first focus drive operation is ended and the flow moves on to the second focus drive operation.

(2) Second Focus Drive Operation

A command is issued for reverse drive, so that the rotation of the focus drive motor is inverted from forward drive, and reverse operation is commenced, back to a pulse count of 3, which is obtained by going back four pulses (set condition) from the pulse count 7 of the peak position detected in the first focus drive operation. Backlash comes into play for a while after this inversion. Specifically, after the start of reverse operation, even if the focus drive motor is driven backward by two pulse counts, the position of the focus lens group 24 will not change. When there is no effect of backlash, the pulse count is reduced by reverse drive of the focus drive motor. Presetting is performed at the preset 2 timing, and the pulse count of the relative position detector is preset to 5. Here, since preset error results in presetting at a different position from that of preset 1, the pulse count is offset. Also, the effect of backlash causes offset, with the pulse count changing to 5 at the contrast peak position. Furthermore, the effect of backlash causes the position of the stored pulse count 7 to deviate from the peak position.

Drive is stopped at the point when a signal comes in for a pulse count of 3 as commanded, the second focus drive operation is ended, and the flow moves on to the third focus drive operation.

(3) Third Focus Drive Operation

A command is issued for forward drive, so that the rotation of the focus drive motor is inverted from reverse drive, and forward operation is commenced, to a pulse count of 7, which is the pulse count at which the peak was detected. Backlash comes into play for a while after this inversion. As commanded, drive is performed to the position where the pulse count is 7, the third focus drive operation is ended, and the overall focus drive operation is also ended.

Due to presetting error of preset 1 and preset 2 caused by the effect of start-up variance of the absolute position detector 725a, drive ends up being stopped at a different position from the peak position of the contrast value detected in the first focus drive operation, the result being that a stop position error occurs. With a method in which an absolute position detector is used to preset the value of the relative position detector, repeated positional precision is poor, and it can be seen that performing a contrast AF method is difficult.

5.3: Contrast Detection Method with First and Second Single Lens Reflex Camera Systems Thus, with a contrast AF method, there is no need for information about the current position of the focus lens group 24, and how well the group can be repositioned at the detected peak position is important.

In view of this, with a contrast AF method for the first and second single lens reflex camera systems 1 and 100, rather than using two position detectors, namely, the absolute position detector 725a and the relative position detector 725b, as with a conventional method, a method is used in which position detection is performed with just the output pulses of the relative position detector 90.

Figure 9:
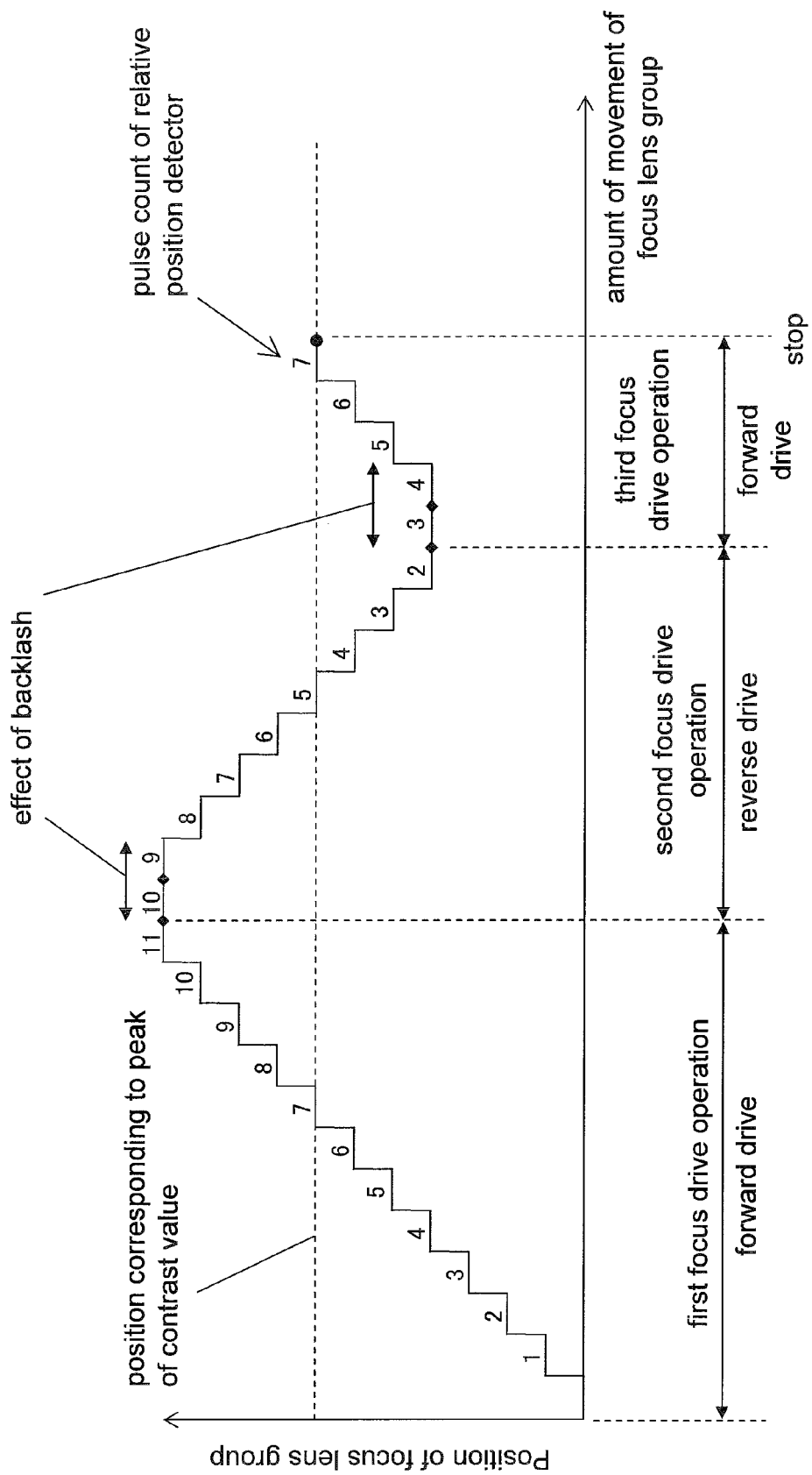
FIG. 9 is a diagram illustrating relative position detection by contrast detection method (without presetting)

FIG. 9 shows an example of the operation of a contrast AF method for a single lens reflex camera when only a relative position detector is used. It can be seen from FIG. 9 that no presetting comes in from an absolute position detector, and it is always possible to obtain pulse information about the relative position detector, so positioning can be accomplished at exactly the position corresponding to the peak of the contrast value detected in the first focus drive operation, without any error in the pulse count. When contrast AF is thus performed using just the relative position detector 90, presetting error caused by the absolute position detector has no effect, and positioning is possible with greater precision in the position corresponding to the peak.

Figure 10:
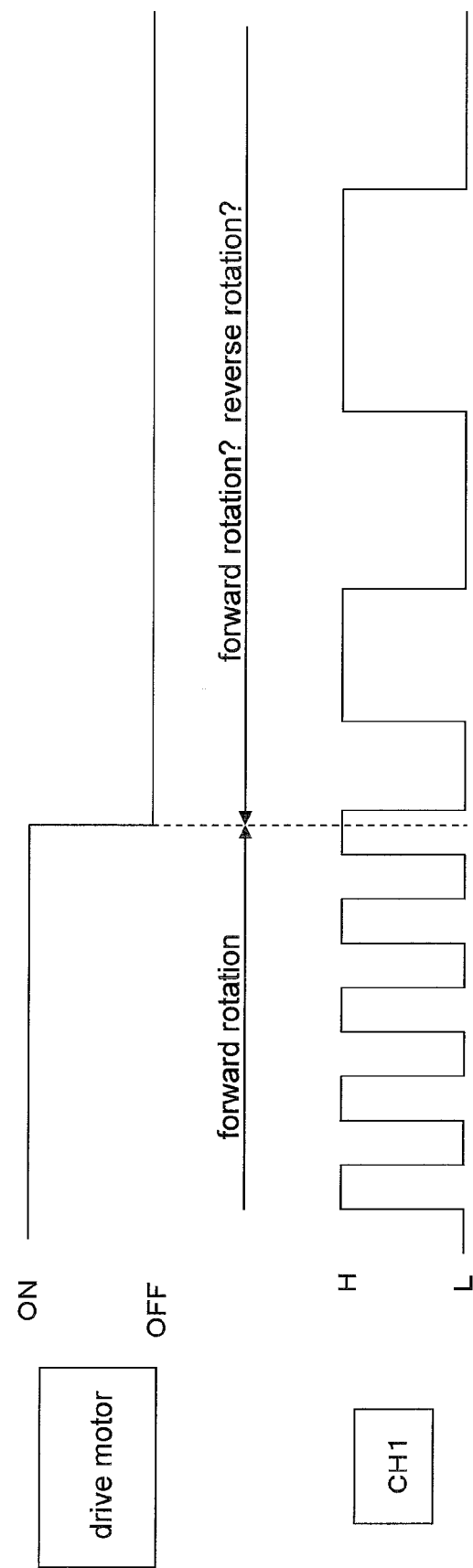
FIG. 10 is a diagram illustrating the determination of the drive direction using a relative position detector (single-phase)
Figure 11:
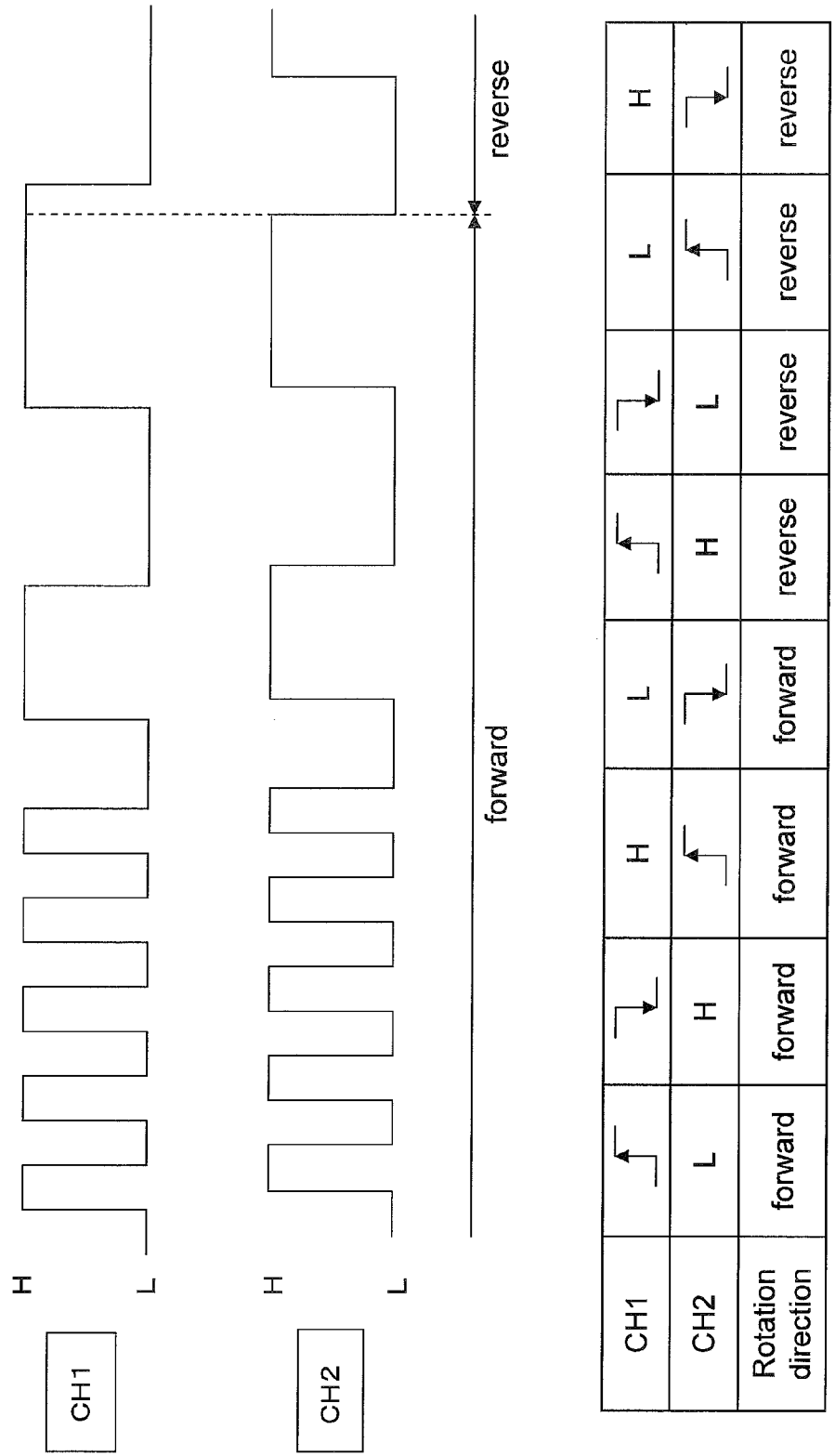
FIG. 11 is a diagram illustrating the determination of the drive direction using a relative position detector (two-phase)

Also, the relative position detector 90 that is used is one with which the drive direction can be determined. The relative position detector 90 can be a photo sensor, an MR element (magnet resistive element), a PSD (position sensitive detector), or the like, but when a photo sensor or an MR element is used, the sensor must be a two-phase type. FIGS. 10 and 11 illustrate the determination of the direction in which the focus lens group 24 is driven, using the relative position detector 90. FIG. 10 is when the sensor is a single-phase type, and FIG. 11 a two-phase type.

In FIG. 10, with a single-phase encoder, during rotation of the rotor it can be determined whether the motor is rotating forward or backward by input command to the motor. Accordingly, when there is an input signal to the motor, it can be determined from this motor signal and the pulse number detected by the relative position detector how much the motor has rotated and in which direction.

However, when the motor is temporarily stopped during inversion, even though the motor input signal stops, the rotor of the motor itself does not stop right away, due to momentum. Accordingly, the motor only stops after rotating a certain amount, but the rotor does not necessarily always rotate in the same direction until the rotation comes to a stop, and may go back and rotate in reverse due to the effect of the mechanical structure. Therefore, it is possible that the pulses outputted when there is no longer a motor input signal and the motor is rotating just by momentum cannot be used to detect the rotational direction if the relative position detector is a single-phase type, and that there will be a corresponding error.

However, as shown in FIG. 11, if the relative position detector is a two-phase type, regardless of any motor input signal, the motor rotation direction can always be ascertained due to the mutual pulse relationship of CH1 and CH2. Accordingly, it is always possible to count the correct output pulses, with no error during inversion.

6: AF Method Selection Operation

FIG. 12 is a diagram illustrating the decision processing by AF method in which a selection can be made according to the combination of interchangeable lens and first and second camera bodies 3 and 300 (type 2). FIG. 12 illustrates the decision processing for selecting an AF method with the first and second camera bodies 3 and 300 depending on the information contained in the interchangeable lens, or information contained in the adapter, or information about whether or not an adapter is mounted.

As discussed above, the first and second camera bodies 3 and 300 corresponding to a type 2 camera body have a shorter flange focal distance than with a conventional camera body (type 1). Also, the type 1-A and type 1-B interchangeable lenses are both an interchangeable lens corresponding to a conventional camera body (type 1) with a longer flange focal distance.

Furthermore, a type 1-A interchangeable lens is compatible with a phase difference detection method in an AF method. On the other hand, a type 1-B interchangeable lens is compatible with a contrast detection method in addition to a phase difference detection method in an AF method. Because it is compatible with a contrast detection method, a type 1-B interchangeable lens can drive a focus lens group that is the same as the first and second interchangeable lenses 2 and 200. Specifically, a type 1-A interchangeable lens has drive margin ranges H1 and H2, just as do the first and second interchangeable lenses 2 and 200, and has the relative position detector 90 with which direction can be determined. A type 2 interchangeable lens is compatible with the first and second camera bodies 3 and 300 (type 2) that have a shorter flange focal distance than a conventional camera body (type 1).

A primary assumption is that the nonvolatile memory 52 of the interchangeable lens holds as lens information a lens ID and information about whether or not a contrast detection method is possible. Lens ID expresses the type of interchangeable lens, and where is information that allows us to determine whether the interchangeable lens is a type 1-A, type 1-B, or type 2. The information about whether or not a contrast detection method is possible is information related to whether or not the interchangeable lens is compatible with a contrast detection method. In the case of a type 1-A interchangeable lens, the lens information includes information that the interchangeable lens is not compatible with a contrast detection method. In the case of a type 1-B or type 2 interchangeable lens, the lens information includes information that the interchangeable lens is compatible with a contrast detection method.

Also, two types of adapter are possible, as with the adapter A and adapter B mentioned above. The following four scenarios are possible for adapters A and B.

(1) When the focal point detection unit 6 compatible with a phase difference detection method and the adapter microprocessor 7 are installed.

(2) When the adapter microprocessor 7 is installed, but the focal point detection unit 6 compatible with a phase difference detection method is not installed.

(3) When neither the focal point detection unit 6 compatible with a phase difference detection method nor the adapter microprocessor 7 is installed.

(4) When the adapter microprocessor 7 is not installed, but the focal point detection unit 6 compatible with a phase difference detection method is installed.

The adapter microprocessor 7 installed in the adapter has a function of controlling signal lines, such as the power supply that is supplied from the camera body to the interchangeable lens or the adapter, or information that is exchanged (a) between the camera body and the interchangeable lens, (b) between the camera body and the adapter, and (c) between the interchangeable lens and the adapter. When a focal point detection unit 6 that is compatible with a phase difference detection method is installed in the adapter, there is a function of calculating the Df amount on the basis of the information obtained from the focal point detection unit 6. In the case of condition (4) above, the Df amount is calculated with the interchangeable lens or the camera body on the basis of information obtained from the focal point detection unit 6.

An example will be given here in which the camera body determines whether or not a focal point detection unit compatible with a phase difference detection method is installed in the adapter. Assuming the above-mentioned conditions (1) and (2) for the adapter, the camera body reads whether or not the focal point detection unit 6 compatible with a phase difference detection method is installed from the adapter microprocessor 7 installed in the adapter, and can determine whether or not a phase difference detection method can be used with the adapter. More specifically, the body microcomputer 12 determines whether or not the adapter 4 is compatible with a phase difference detection method on the basis of the adapter information held in the adapter microprocessor 7.

Adapter information includes information that allows a determination as to whether the adapter A or the adapter B is applicable. In the case of the adapter A, the body microcomputer 12 determines that it is compatible with a phase difference detection method, and in the case of the adapter B, the body microcomputer 12 determines that it is not compatible with a phase difference detection method. When a type 1-A interchangeable lens and the adapter A are connected to a type 2 camera body, the body microcomputer 12 determines that this is compatible with a phase difference detection method, but when a type 1-A interchangeable lens and the adapter B are connected to a type 2 camera body, the body microcomputer 12 determines that this is incompatible with a phase difference detection method. When a type 1-B interchangeable lens and the adapter A are connected to a type 2 camera body, the body microcomputer 12 determines that this is compatible with a phase difference detection method, but when a type 1-B interchangeable lens and the adapter B are connected to a type 2 camera body, the body microcomputer 12 determines that this is incompatible with a phase difference detection method. Also, since a type 2 interchangeable lens and a type 2 camera body are connected directly, without going through an adapter, there is no information from an adapter.

Next, we will describe processing for determining an AF method that can be selected with a type 2 camera body, using the above-mentioned lens information and adapter information. First, the lens information includes lens ID or information related to compatibility with a contrast detection method. This lens information can be used to determined whether or not a contrast detection method can be used.

More specifically, with a type 1-A interchangeable lens, the lens information includes information to the effect that the interchangeable lens is not compatible with a contrast detection method. With a type 1-B or type 2 interchangeable lens, the lens information includes information to the effect that the interchangeable lens is compatible with a contrast detection method.

It is possible to determine whether or not a phase difference detection method can be used by using information related to compatibility with a phase difference detection method among the adapter information (or adapter ID information). More specifically, when an adapter is mounted, it can be determined on the basis of this adapter information that there is compatibility with a phase difference detection method (when the adapter A is mounted) or there is no compatibility with a phase difference detection method (when the adapter B is mounted).

Therefore, when a type 1-A interchangeable lens is connected via the adapter A to a type 2 camera body, the AF method that can be selected for the camera body is a phase difference detection method. When a type 1-A interchangeable lens is connected via the adapter B to a type 2 camera body, there is no AF method that can be selected for the camera body, and only manual focus (MF) can be used. When a type 1-B interchangeable lens is connected via the adapter A to a type 2 camera body, the AF method that can be selected for the camera body is either a phase difference detection method or a contrast detection method. When a type 1-B interchangeable lens is connected via the adapter B to a type 2 camera body, the AF method that can be selected for the camera body is a contrast detection method. When a type 2 interchangeable lens is connected to a type 2 camera body without the use of an adapter, the AF method that can be selected for the camera body is a contrast detection method.

The determination as to whether or not a focal point detection unit of the phase difference detection method is installed in the adapter can be made by the camera body or the interchangeable lens on the basis of information outputted from the adapter microprocessor installed in the adapter. Also, with a configuration in which, for example, a protrusion or a recess is provided on the adapter side at the place where the adapter comes into contact with the camera body or the interchangeable lens, then whether or not an adapter is mounted and whether or not there is compatibility with a phase difference detection method can be determined by detecting a change in a mechanical or electrical switch inside the camera body or interchangeable lens. It is also possible for the configuration to be such that there is merely a difference in the type of signal or the voltage level obtained from a specific electrical contact. Thus, it is possible to identify the type of adapter with the camera body, even though no microprocessor is included in the adapter.

FIG. 13 is a flowchart 1 related to AF method selection processing performed by the first and second camera bodies (type 2). FIG. 13 shows the processing flow of the body microcomputer 12 installed in the first and second camera bodies 3 and 300 (type 2). The flow is started from AF method selection processing.

In step 1, the body microcomputer 12 of the camera body acquires lens information from the lens microcomputer 20 installed in the interchangeable lens. As described through reference to FIG. 12, the lens information includes a lens ID expressing the type of interchangeable lens (such as type 1-A, type 1-B, or type 2) and/or information related to whether or not there is compatibility with a contrast detection method.

In step 2, it is determined whether or not an adapter has been mounted. As discussed above, whether or not an adapter has been mounted may be detected mechanically, electrically, or by some other method. Here, if the body microcomputer 12 determines that no adapter is mounted, the flow proceeds to step 3. In step 3, as described for FIG. 12, the interchangeable lens used in a state in which no adapter is mounted is a type 2 interchangeable lens. In this case, the body microcomputer 12 selects a contrast detection method as the AF method, and the AF method selection processing is ended.

In step 2, if an adapter is mounted, the flow proceeds to step 4. In step 4, adapter information is acquired from the adapter microprocessor 7 installed in the adapter. As described with reference to FIG. 12, adapter information may be information to the effect that an adapter compatible with a phase difference detection method (when the adapter ID indicates adapter A), an adapter incompatible with a phase difference detection method (when the adapter ID indicates adapter B), or another adapter has or has not been mounted. In step 5, the body microcomputer 12 determines whether or not the adapter is compatible with a phase difference detection method. If the adapter is compatible with a phase difference detection method, the flow proceeds to step 6.

In step 6, it is determined whether or not the interchangeable lens is compatible with a contrast detection method on the basis of the lens information acquired in step 1. If it is compatible with a contrast detection method, the flow proceeds to step 8. In the flow up to this point, it can be specified that a type 1-B interchangeable lens compatible with a contrast detection method and an adapter A compatible with a phase difference detection method have been mounted to the camera body.

If the flow proceeds to step 8, then either a contrast detection method or a phase difference detection method can be selected as the AF method, so the AF method is automatically selected by the camera body (selecting the one that its better for each function, such as moving or still images, or the one specified by default), or the method specified by the user is selected. Here, if a contrast detection method is selected, the flow proceeds to step 3 and the contrast detection method is set, but if a phase difference detection method is selected, the flow proceeds to step 9 and a phase difference detection method is set.

In step 6, if there is no compatibility with a contrast detection method, the flow proceeds to step 9. In step 9, since it is known that a type 1-A interchangeable lens that is not compatible with a contrast detection method and an adapter A that is compatible with a phase difference detection method are mounted to the camera body, the body microcomputer 12 selects a phase difference detection method as the AF method.

In step 5, if an adapter that is not compatible with a phase difference detection method is mounted, the flow proceeds to step 7. In step 7, it is determined whether or not the interchangeable lens is compatible with a contrast detection method, and if it is compatible with a contrast detection method, the flow proceeds to step 3. Here, it is known that a type 1-B interchangeable lens that is compatible with a contrast detection method and an adapter B that is not compatible with a phase difference detection method are mounted, and a contrast detection method is selected as the AF method.

In step 7, if the interchangeable lens is not compatible with a contrast detection method, the flow proceeds to step 10.

Here, since a type 1-A interchangeable lens that is not compatible with a contrast detection method and an adapter B that is not compatible with a phase difference detection method are mounted to the camera body, no method is selected as the AF method, and manual focus is set.

In the above description, an example was given of acquiring lens information from the interchangeable lens connected directly or via an adapter to the camera body, or of acquiring adapter information from the adapter connected to the body, but even if neither information is acquired, an AF method may be selected depending on whether or not an adapter is mounted. The flow for this situation will now be described through reference to FIG. 14.

Figure 14:
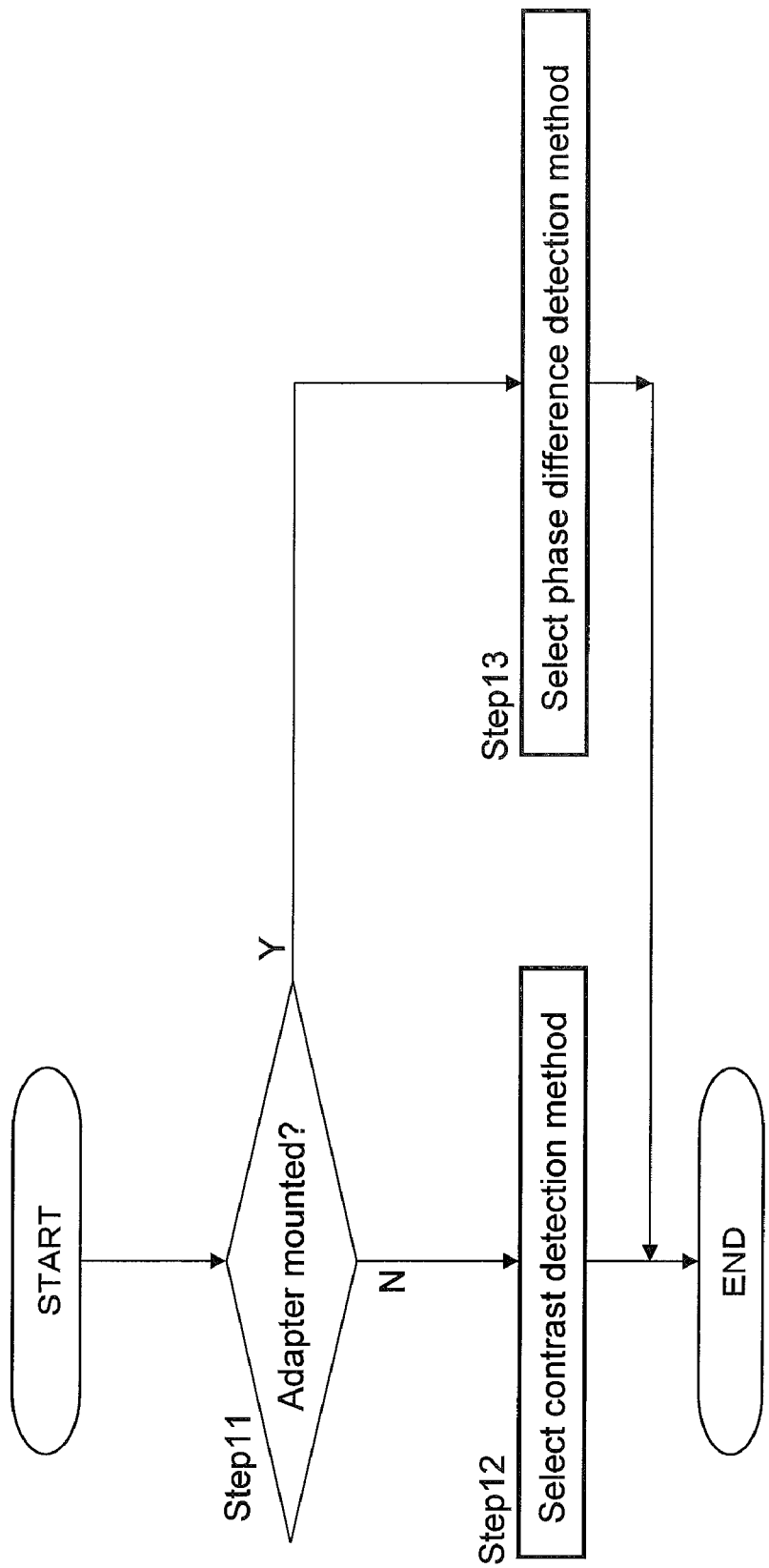
FIG. 14 is a flowchart (2) related to AF method selection processing performed by first and second camera bodies (type 2)

FIG. 14 is a flowchart 2 related to AF method selection processing performed by the first and second camera bodies (type 2). In FIG. 14, the processing flow is shown for the body microcomputer 12 installed in the type 2 camera body, and processing is started from the start of AF method selection processing. In step 11, the body microcomputer 12 determines whether or not an adapter has been mounted.

The determination as to whether or not an adapter is mounted can be made by detecting information outputted from the adapter microprocessor 7 installed in the adapter, as well as whether there is a change in the type of signal or the voltage level, whether the interchangeable lens or camera body has been mechanically or electrically switched on or off by the mounting of an adapter, or the like (mounting detector).

If no adapter has been mounted, the flow proceeds to step 12 and a contrast detection method is selected. Here, a state is indicated in which a type 2 interchangeable lens is mounted to a type 2 camera body, and a contrast detection method is selected as the AF method.

Meanwhile, if it is determined in step 11 that an adapter has been mounted, the flow proceeds to step 13 and a phase difference detection method is selected. Here, a state is indicated in which a type 1-A or type 1-B interchangeable lens is connected to a type 2 camera body via an adapter A that is compatible with a phase difference detection method, and a phase difference detection method is effective as the AF method.

In this flowchart 2, it is assumed that there is no adapter B that is not compatible with a phase difference detection method, or that the frequency of application of an adapter B is low.

Figure 15:
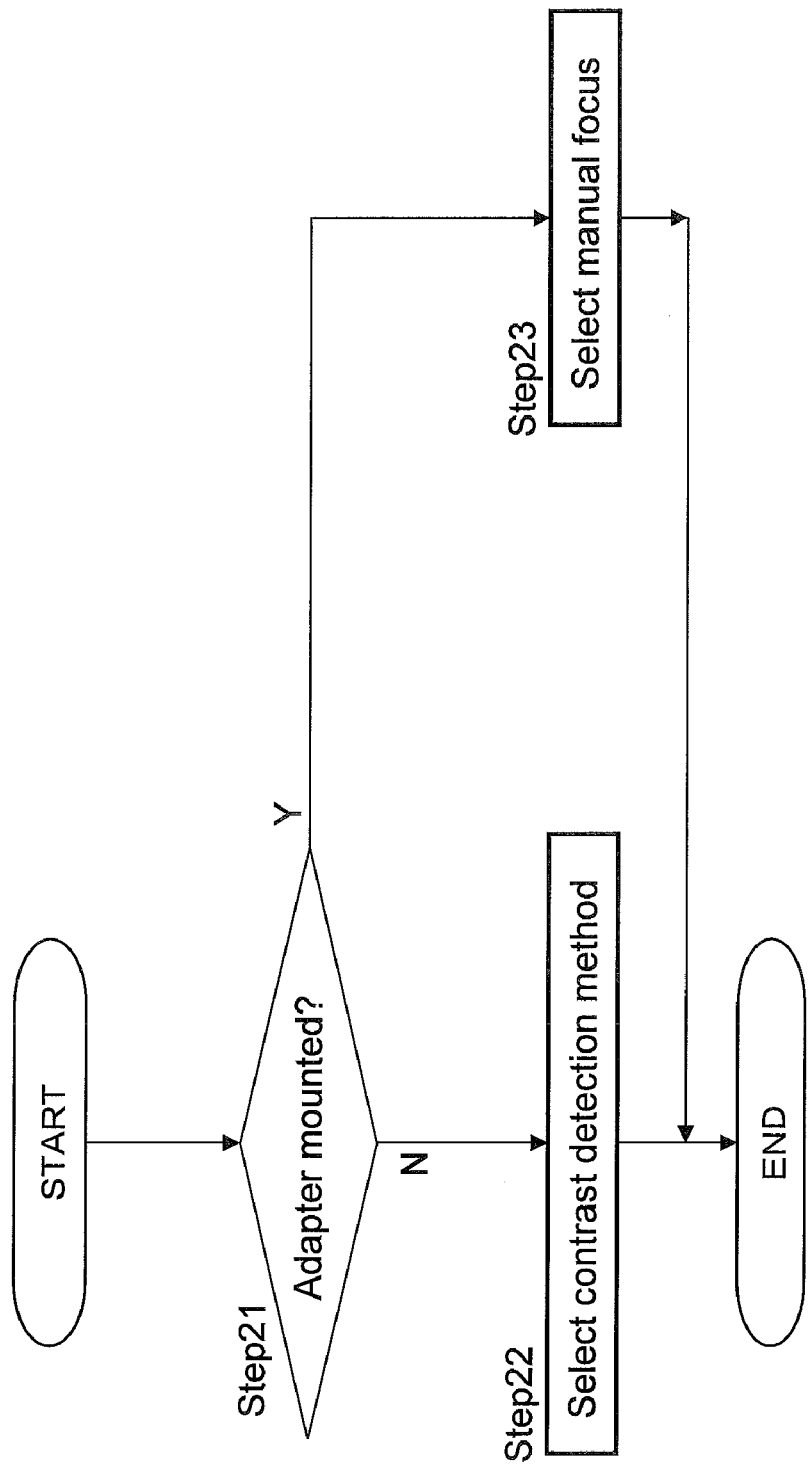
FIG. 15 is a flowchart (3) related to AF method selection processing performed by first and second camera bodies (type 2)

FIG. 15 is a flowchart 3 related to AF method selection processing performed by the first and second camera bodies (type 2). FIG. 15 shows the processing flow of the body microcomputer 12 installed in a type 2 camera body, and the processing is started from the start of AF method selection processing. In step 21, it is determined whether or not an adapter is mounted.

The determination as to whether or not an adapter is mounted can be made by detecting information outputted from the adapter microprocessor 7 installed in the adapter, as well as whether there is a change in the type of signal or the voltage level, whether the interchangeable lens or camera body has been mechanically or electrically switched on or off by the mounting of an adapter, or the like.

If an adapter has not been mounted, the flow proceeds to step 22 and a contrast detection method is selected. Here, a state is indicated in which a type 2 interchangeable lens is mounted to a type 2 camera body, and a contrast detection method is selected as the AF method.

Meanwhile, if it is determined in step 21 that an adapter has been mounted, the flow proceeds to step 23 and manual focus is selected. Here, a state is indicated in which a type 1-A or type 1-B interchangeable lens is connected to a type 2 camera body via an adapter A that is compatible with a phase difference detection method, and manual focus is selected in this example.

This flowchart 3 shows an example in which manual focus is selected by default whether an adapter A that is compatible with a phase difference detection method is mounted, or an adapter B that is not compatible with a phase difference detection method is mounted. If an adapter A that is compatible with a phase difference detection method is mounted, manual focus is set by default, but the user can override this and select a phase difference detection method.

As discussed above, in this embodiment the focal point detection method is set as follows according to the situation.

(1) A contrast detection type of auto-focus is selected when an interchangeable lens (type 2) that is compatible with contrast detection type of auto-focus is mounted.

(2) Either a contrast detection type or a phase difference detection type of auto-focus is selected when an interchangeable lens (type 1-B) that is compatible with a contrast detection type of auto-focus is mounted via an adapter (adapter A) having a phase difference detection unit.

(3) A phase difference detection type of auto-focus is selected when an interchangeable lens (type 1-A) that is not compatible with a contrast detection type of auto-focus is mounted via an adapter (adapter A) having a phase difference detection unit.

The determination as to whether or not there is compatibility with a contrast detection type of auto-focus can be made depending on the lens information, the lens model, whether or not there are drive margin ranges H1 and H2, whether or not the relative position detector can determine the movement direction of the focus lens, whether the relative position detector corresponds to a single-phase encoder or a two-phase encoder, and so forth.

7: Modification Example of Using a Second Adapter

Figure 16:
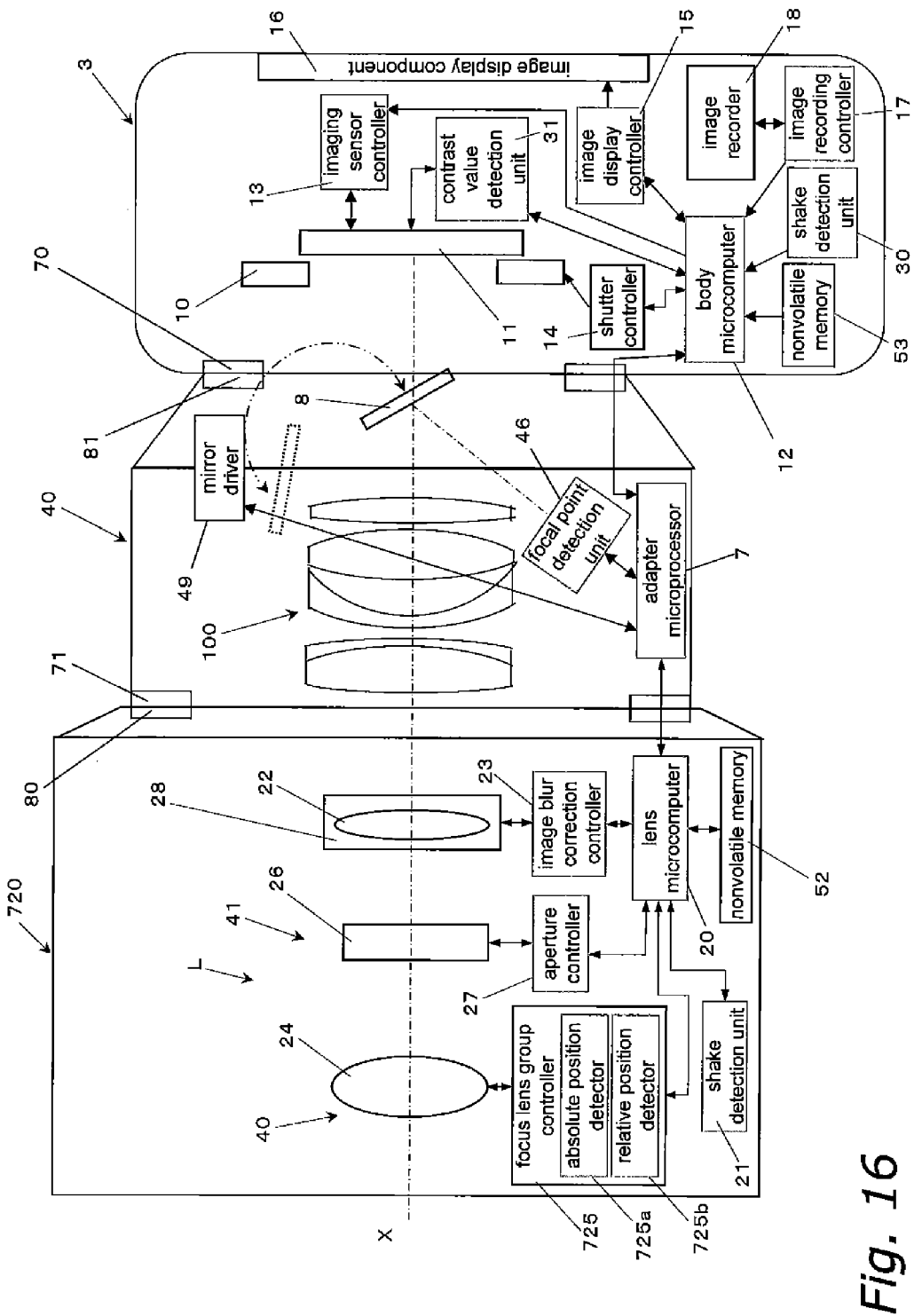
FIG. 16 is a diagram of the overall configuration of a camera system in which a second adapter is used.

A modification example 1 of the above-mentioned adapter A will now be described. For the purpose of this description, FIG. 16 illustrates a case in which the first camera body 3 and the third interchangeable lens 720 are used. FIG. 16 shows a combination of the first camera body 3, the third interchangeable lens, and a second adapter connected between these.

7.1: Second Adapter

A second adapter 40 comprises the second body mount 81 that can be connected with the first lens mount 70 had by the first camera body, the second lens mount 71 that can be connected with the first body mount 80 had by the third interchangeable lens, the focal point detection unit 6, the adapter microprocessor 7, the half mirror 8, a mirror driver 49 that drives the half mirror 8, and a relay optical system 101.

7.2: Overall Configuration of Camera System with Second Adapter

As shown in FIG. 16, light from a subject (not shown) passes through the interchangeable lens 720, the light incident on the adapter 40 passes through the relay optical system 101, and part of the light is reflected by the half mirror 8 and is incident on the focal point detection unit 6. The rest of the light passes through and is incident as a subject image on the imaging sensor 11 of the camera body 3. This subject image is electrically converted into an upright image and displayed on the image display component 16, so that an upright image of the subject can be viewed.

The back focus of the interchangeable lens 720 is longer than the distance (flange focal distance) in the optical axis direction from the second lens mount 71 to the imaging sensor 11 of the first camera body 3. Therefore, the relay optical system 101 is designed so that the optical distance from the second lens mount 71 to the imaging sensor 11 of the first camera body 3 will be equal to the back focus of the interchangeable lens 720.

7.3: Operation During Imaging

The operation during imaging will not be described again, since it is substantially the same as that with a camera system equipped with the first adapter 4 shown in FIG. 4 and discussed above.

8: Modification Example of Using a Third Adapter

Figure 17:
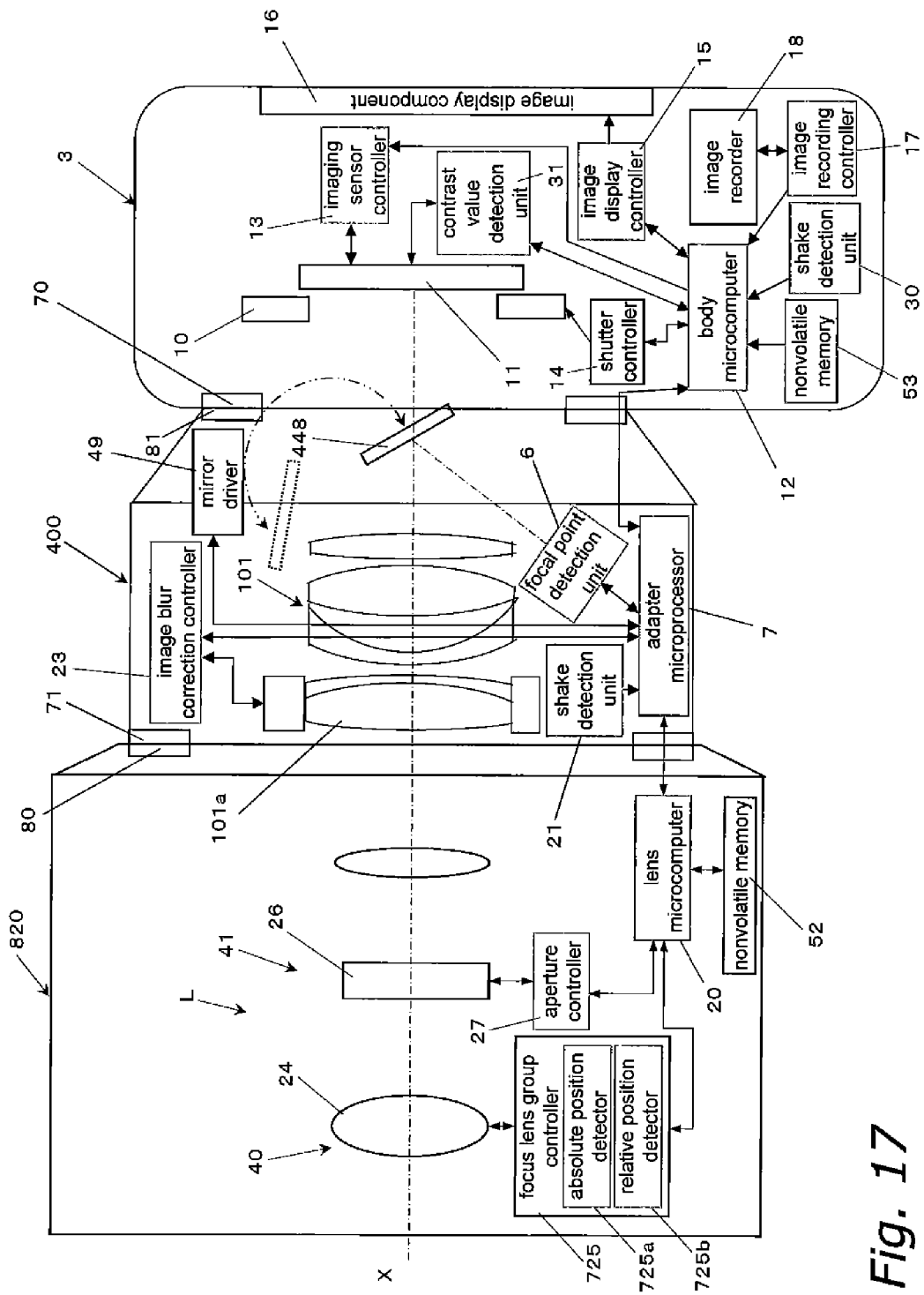
FIG. 17 is a diagram of the overall configuration of a camera system in which a third adapter is used.

A second modification example of the above-mentioned adapter A will now be described. For the sake of convenience, we will describe a case of using the first camera body 3 and a fourth interchangeable lens 820 (without an image blur correcting function) in FIG. 17. FIG. 17 shows a combination of the first camera body 3, the fourth interchangeable lens 820, and a third adapter 400 that is connected between these two.

8.1: Fourth Interchangeable Lens

The fourth interchangeable lens 820 differs from the third interchangeable lens 720 in that it has no shake detection unit 21 or image blur correction controller 23. The rest of the constitution is the same as that of the third interchangeable lens 720.

8.2: Third Adapter

A third adapter 400 comprises the second body mount 81 that can be connected to the first lens mount 70 had by the first camera body 3, the second lens mount 71 that can be connected to the first body mount 80 of the fourth interchangeable lens, the focal point detection unit 6, the adapter microprocessor 7, the half mirror 8, the mirror driver 49 that drives the half mirror 8, and a relay optical system 101. The third adapter 400 further has the shake detection unit 21 and the image blur correction controller 23. The relay optical system 101 further has a blur correcting lens 101a.

The shake detection unit 21 and the image blur correction controller 23 will not be described again, since they are the same as described for the first interchangeable lens 2.

8.3: Overall Configuration of Camera System with Adapter C

As shown in FIG. 17, light from a subject (not shown) passes through the fourth interchangeable lens 820, the light incident on the adapter 400 passes through the relay optical system 101, and part of the light is reflected by the half mirror 8 and is incident on the focal point detection unit 6. The rest of the light passes through and is incident as a subject image on the imaging sensor 11 of the camera body 3. This subject image is electrically converted into an upright image and displayed on the image display component 16, so that an upright image of the subject can be viewed.

The back focus of the interchangeable lens 820 is set longer than the distance (flange focal distance) from the second lens mount 71 to the imaging sensor 11 of the camera body 3. Therefore, the relay optical system 101 is designed so that the optical distance from the second lens mount 71 to the imaging sensor 11 of the camera body 3 will be equal to the flange focal distance of the interchangeable lens 820.

Furthermore, image blur can be corrected by driving the blur correcting lens 101a of the relay optical system 101 within a plane perpendicular to the optical axis X.

8.4: Operation During Imaging

The operation during imaging is substantially the same as that with a single lens reflex camera system equipped with the first adapter 4 shown in FIG. 4 and discussed above, and therefore only the differences will be described.

The adapter microprocessor 7 sends the body microcomputer 12 information to the effect that an adapter has been connected, via an electrical contact (not shown) of the lens mount 70. At this point the adapter microprocessor also receives information related to whether or not an image blur corrector is installed in the interchangeable lens 820, determines how the various functions will be used in the imaging operation, and sends the result to the body microcomputer 12. For example, with the configuration shown in FIG. 17, a command is issued so that the image blur correcting function is handled by the adapter 400 and focal point detection is performed by the focal point detection unit 6 built into the adapter.

The first, second, and third adapters and the first and second camera bodies described so far can function in any combination, which makes it possible to provide the user with autofocus and image blur correction in the optimal state in many different combinations of the type of interchangeable lens, whether or not there is a blur correcting function, and so forth.

9: Modification Example Featuring Fourth Adapter

Figure 18:
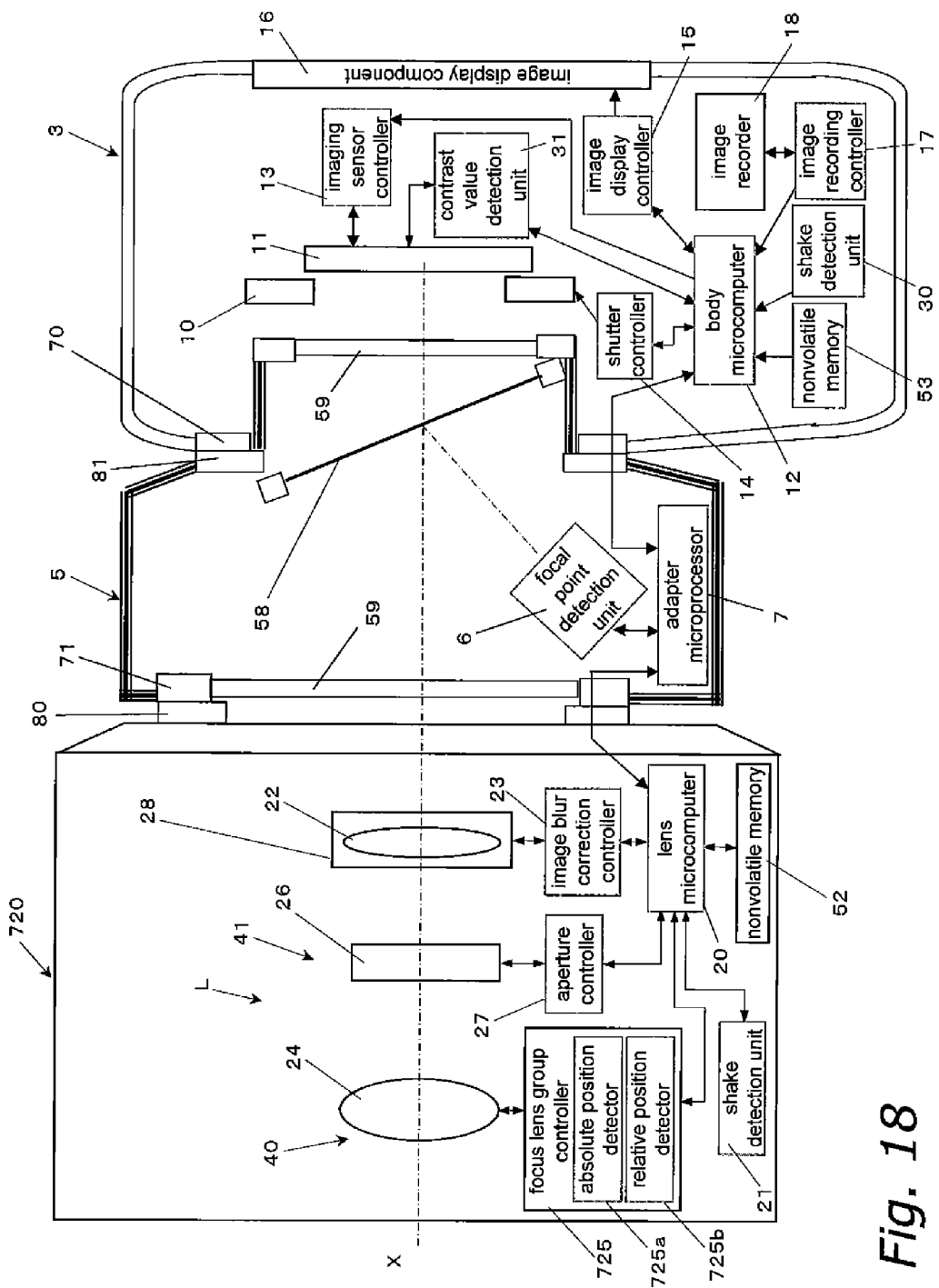
FIG. 18 is a diagram of the overall configuration of a camera system in which a fourth adapter is used.

A modification example 3 of the above-mentioned adapter A will now be described. For the sake of convenience, we will describe a case of using the first camera body 3 and the third interchangeable lens 720 in FIG. 18. FIG. 18 shows a combination of the first camera body 3, the third interchangeable lens, and the fourth adapter that is connected between these.

9.1: Fourth Adapter

The fourth adapter 5 differs from the first adapter 4 in that it does not have the half mirror 8 and the mirror driver 9 of the first adapter 4 shown in FIG. 4, and instead has a pellicle mirror 58 and a protective glass sheet 59. The rest of the configuration is substantially the same as that of the first adapter 4.

9.2: Overall Configuration of Camera System with Fourth Adapter

As shown in FIG. 18, light from a subject (not shown) passes through the imaging optical system L of the interchangeable lens 720 and is incident on the adapter 5. Part of the light incident on the adapter 5 is reflected by the pellicle mirror 58 and is incident on the focal point detection unit 6. The rest of the light passes through the pellicle mirror 58 and is incident as a subject image on the imaging sensor 11 of the camera body 3. This subject image is electrically converted into an upright image and displayed on the image display component 16. Consequently, an upright image of the subject can be viewed on the image display component 16. Also, since the pellicle mirror 58 is an extremely thin semi-permeable thin-film, the protective glass sheet 59 is provided so that no external force is directly exerted and so as to cover the openings of both the first body mount 80 and the second lens mount 71.

The pellicle mirror 58 stays disposed along the optical path even during imaging. During imaging, light that has passed through the pellicle mirror 58 is received by the imaging sensor 11.

10: Modification Example Featuring Fifth Adapter

Figure 19:
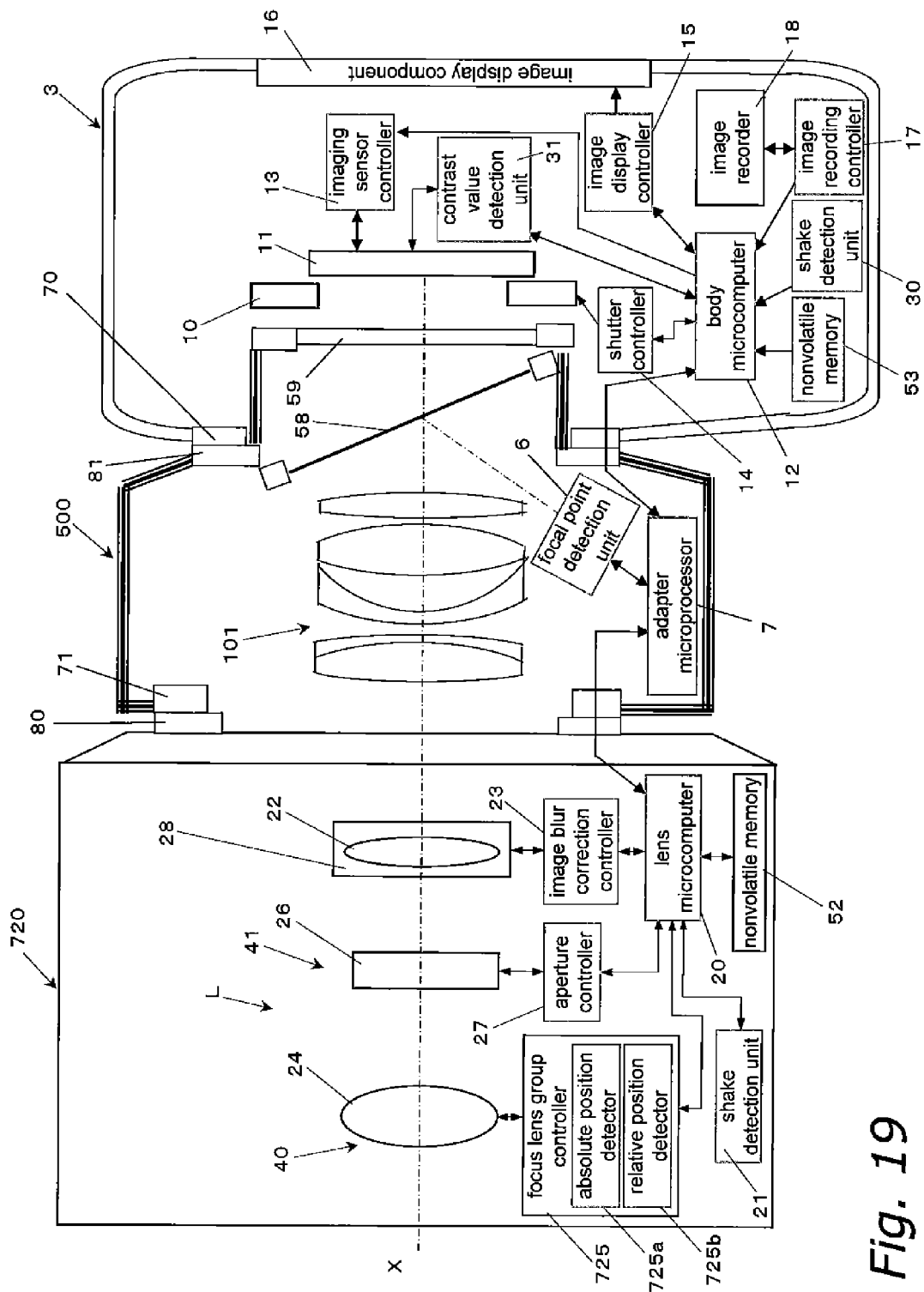
FIG. 19 is a diagram of the overall configuration of a camera system in which a fifth adapter is used.

The fifth adapter 500 shown in FIG. 19 differs from the second adapter 40 in that it does not have the half mirror 8 and the mirror driver 49 of the second adapter 40 shown in FIG. 16, and instead has the pellicle mirror 58 and the protective glass sheet 59. The rest of the configuration is the same as that of the second adapter 40.

11: Modification Example Featuring Sixth Adapter

Figure 20:
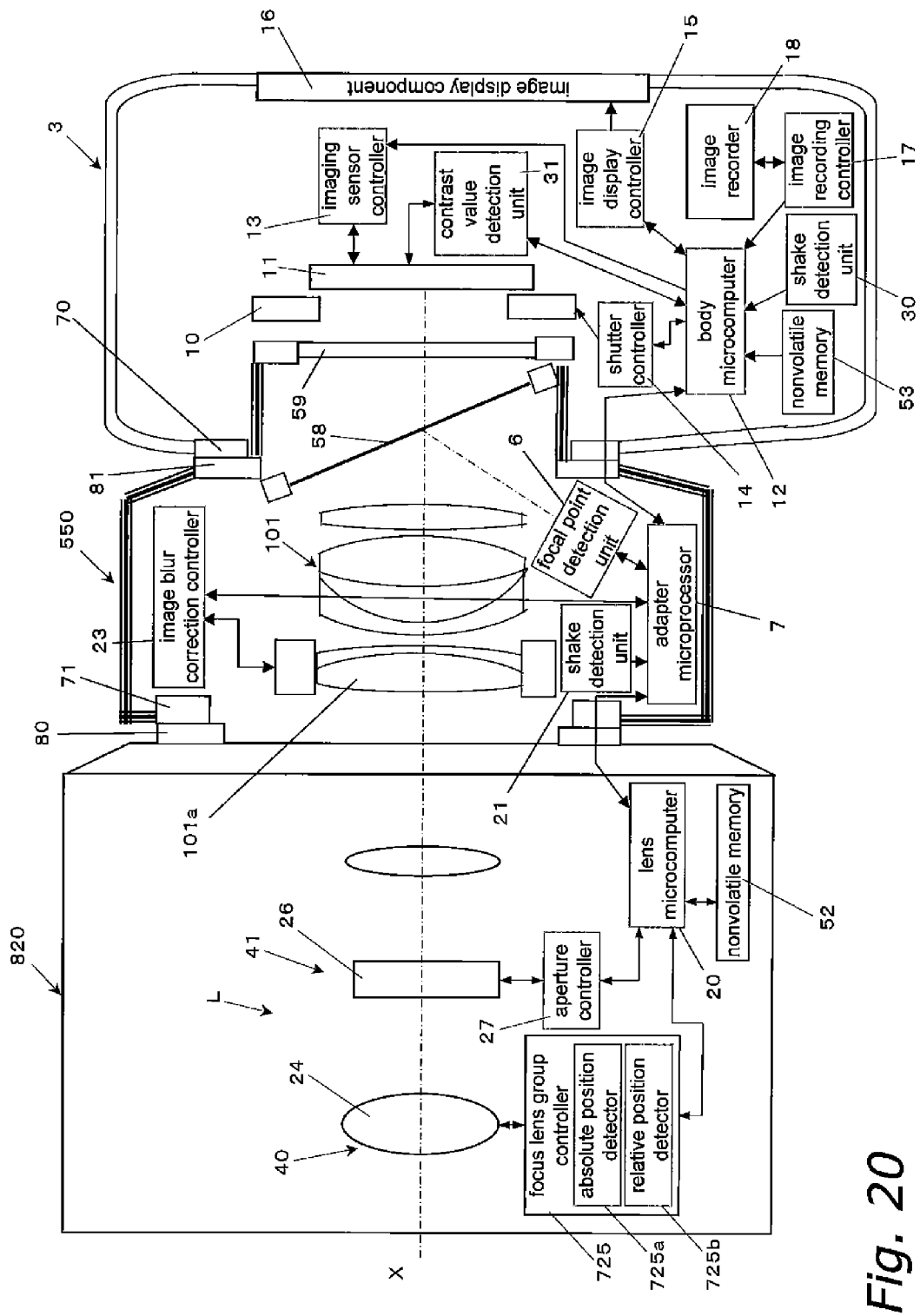
FIG. 20 is a diagram of the overall configuration of a camera system in which a sixth adapter is used.

The sixth adapter 550 shown in FIG. 20 differs from the third adapter 400 in that it does not have the half mirror 8 and the mirror driver 49 of the third adapter 400 shown in FIG. 17, and instead has the pellicle mirror 58 and the protective glass sheet 59. The rest of the configuration is the same as that of the third adapter 400.

12: Features of Camera System

The camera system described above has the following features.

(1)

With the above-mentioned camera system, if the interchangeable lens is compatible with a contrast detection method, the body microcomputer 12 selects a contrast detection method as the focal point detection method. If the interchangeable lens is not compatible with a contrast detection method, but the adapter is compatible with a phase difference detection method, the body microcomputer 12 selects a phase difference detection method as the focal point detection method. That is, even though the interchangeable lens is not compatible with a contrast detection method, as long as the adapter is compatible with a phase difference detection method, focal point detection can be performed by phase difference detection method. Accordingly, with this camera system, many different interchangeable lenses are compatible, which enhances versatility.

Also, a difference between the back focus of the interchangeable lens and the flange focal distance of the camera body 3 can be corrected by mounting an adapter, so even an interchangeable lens and camera body combination in which the flange focal distance and the back focus are not compatible can still be used as a camera system by using an adapter.

(2)

If the interchangeable lens is compatible with a contrast detection method and the adapter is compatible with a phase difference detection method, the body microcomputer 12 selects either a contrast detection method or a phase difference detection method as the focal point detection method. Accordingly, either a contrast detection method or a phase difference detection method can be selected as the focal point detection method, and the interchangeable lens and adapter functions can be utilized to full potential.

(3)

Since the body microcomputer 12 determines whether or not the interchangeable lens is compatible with a contrast detection method on the basis of lens information, the camera body 3 can be used with a variety of interchangeable lenses, and this expands the range of interchangeability.

(4)

Since the body microcomputer 12 determines whether or not the adapter is compatible with a phase difference detection method on the basis of adapter information, even if the camera body 3 has not phase difference detection unit, the phase difference detection unit of the adapter can be utilized so that AF can be performed by phase difference detection method.

(5)

Since the lens information includes information related to the focal point detection method and lens ID, the camera body 3 can easily and accurately determine the focal point detection method of the interchangeable lens. Consequently, the proper determination can be made according to the focal point detection method of the interchangeable lens.

Furthermore, the lens information may include information related to whether or not there are drive margin ranges H1 and H2 for the focus lens group 24. It can be determined on the basis of this information whether or not the interchangeable lens is compatible with a contrast detection method.

For example, if the interchangeable lens has a drive margin range, the body microcomputer 12 determines that the interchangeable lens is compatible with a contrast detection method. If the interchangeable lens does not have a drive margin range, the body microcomputer 12 determines that the interchangeable lens is not compatible with a contrast detection method.

(6)

Also, it is conceivable that whether or not the interchangeable lens is compatible with a contrast detection method can be determined on the basis of information related to the specifications of the relative position detector. This information is included in the lens information, for example. If the relative position detector has a two-phase encoder, the body microcomputer 12 determines that the interchangeable lens is compatible with a contrast detection method. If the relative position detector has a single-phase encoder, the body microcomputer 12 determines that the interchangeable lens is not compatible with a contrast detection method.

(7)

Since the adapter has a phase difference detection type of focal point detection unit 6, if the interchangeable lens is compatible with a contrast detection method, either a phase difference detection method or a contrast detection method can be selected, which increases versatility.

(8)

When it is detected that an adapter has been mounted to the first camera body 3, and a focal point detection method is selected on the basis of this detection result, the focal point detection method can be selected by a simpler system.

(9)

As described above, this camera system 1 and camera body 3 are compatible with a variety of interchangeable lenses, and this enhances versatility.

13: Other Working Examples

The single lens reflex system, camera body, interchangeable lens, and adapter according to the present invention are not limited to or by the embodiments given above, and various modifications and changes are possible without departing from the gist of the present invention.

The invention claimed is:

1. An imaging device for acquiring an image of a subject, comprising:

an interchangeable lens including an imaging optical system arranged to form an optical image of the subject, and a lens controller configured to hold lens information including information related to a focal point detection method; and a camera body including an imaging part configured to convert an optical image of the subject into an image signal, a focal point detector configured to detect a contrast value on the basis of the image signal and configured to determine the focal state of the optical image on the basis of the contrast value, and a main body controller configured to acquire the lens information held in the lens controller and configured to select the focal point detection method on the basis of the lens information, the camera body allowing the interchangeable lens to be mounted, or allowing the interchangeable lens to be mounted via an adapter, the main body controller is configured to select a contrast detection method as the focal point detection method if the interchangeable lens is compatible with a contrast detection method and the interchangeable lens is attached to the camera body without an adapter, and the main body controller is configured to select a phase difference detection method as the focal point detection method if the interchangeable lens is not compatible with a contrast detection method, the interchangeable lens is attached to the camera body via an adapter and the adapter is compatible with a phase difference detection method.

2. The imaging device according to claim 1, wherein the main body controller is configured to select either a contrast detection method or a phase difference detection method as the focal point detection method if the interchangeable lens is compatible with a contrast detection method and the adapter is compatible with a phase difference detection method.

3. The imaging device according to claim 2, wherein the main body controller is configured to determine whether or not the interchangeable lens is compatible with a contrast detection method on the basis of the lens information.

4. The imaging device according to claim 3, wherein the adapter includes an adapter controller configured to hold adapter information including information related to a focal point detection method, and the main body controller is configured to determine whether or not the adapter is compatible with a phase difference detection method on the basis of the adapter information.

5. The imaging device according to claim 4, wherein the interchangeable lens includes a focal point adjuster including a focus lens group included in the imaging optical system and a position detector configured to detect the position of the focus lens group, and the lens information includes at least one type of information selected from among information for specifying the interchangeable lens, information related to whether or not there is a drive margin range for the focus lens group, and information related to the specifications of the position detector.

6. The imaging device according to claim 5, wherein the main body controller is configured to determine that the interchangeable lens is compatible with a contrast detection method if the interchangeable lens includes the drive margin range, and the main body controller is configured to determine that the interchangeable lens is not compatible with a contrast detection method if the interchangeable lens does not include the drive margin range.

7. The imaging device according to claim 6, wherein the position detector includes a relative position detector configured to detect the movement direction and movement amount of the focus lens group, the lens information includes information related to the specifications of the relative position detector, the main body controller is configured to determine that the interchangeable lens is compatible with a contrast detection method if the relative position detector includes a two-phase encoder, and the main body controller is configured to determine that the interchangeable lens is not compatible with a contrast detection method if the relative position detector includes a single-phase encoder.

8. The imaging device according to claim 7, further comprising an adapter, which is a unit that can be mounted to the camera body and the interchangeable lens in between the camera body and the interchangeable lens, and which includes a mirror arranged to reflect part of the light emitted from the imaging optical system, and a second focal point detector configured to utilize the light reflected by the mirror to determine the focal state by a phase difference detection method.

9. The imaging device according to claim 8, wherein the mirror is a pellicle mirror.

10. An imaging device for acquiring an image of a subject, comprising:

an interchangeable lens including an imaging optical system arranged to form an optical image of the subject, the interchangeable lens is configured to be either directly mounted to a camera body or via an adapter which is mounted to the camera body; and the camera body including:
an imaging part configured to convert an optical image of the subject into an image signal,
a focal point detector configured to detect a contrast value on the basis of the image signal and configured to determine the focal state of the optical image on the basis of the contrast value,
a mounting detector configured to detect whether or not the adapter has been mounted to the camera body, and
a main body controller configured to select a focal point detection method on the basis of the detection result of the mounting detector, the camera body allowing the interchangeable lens to be directly mounted, or allowing the interchangeable lens to be mounted via the adapter;
wherein the main body controller is configured to select a phase difference detection method as the focal point detection method if the mounting detector detects that the adapter has been mounted.

11. The imaging device according to claim 10, wherein the main body controller is configured to select a focal point detection method, which is different from the phase difference detection method, when the mounting detector detects that the adapter has not been mounted to the camera body.

12. The imaging device according to claim 10, wherein the camera body does not have a reflecting mirror or a sub-mirror.

13. A camera body that is used along with an interchangeable lens in an imaging device configured to acquire an image of a subject, the interchangeable lens comprising an imaging optical system arranged to form an optical image of the subject, and a lens controller configured to hold lens information including information related to a focal point detection method, and which allows the interchangeable lens to be mounted, or allows the interchangeable lens to be mounted via an adapter, the camera body comprising:

an imaging part configured to convert an optical image of the subject into an image signal;

a focal point detector configured to detect a contrast value on the basis of the image signal and configured to determine the focal state of the optical image on the basis of the contrast value; and a main body controller configured to acquire the lens information held in the lens controller and configured to select the focal point detection method on the basis of the lens information, wherein the main body controller is configured to select a contrast detection method as the focal point detection method if the interchangeable lens is compatible with a contrast detection method and the interchangeable lens is attached to the camera body without an adapter, and the main body controller is configured to select a phase difference detection method as the focal point detection method if the interchangeable lens is not compatible with a contrast detection method, the interchangeable lens is attached to the camera body via an adapter and the adapter is compatible with a phase difference detection method.

* * * * *